(12) United States Patent
Kim et al.

(10) Patent No.: US 12,488,715 B2
(45) Date of Patent: Dec. 2, 2025

(54) ELECTRONIC APPARATUS AND CONTROL METHOD THEREOF

(71) Applicant: SAMSUNG ELECTRONICS CO., LTD., Suwon-si (KR)

(72) Inventors: Eunah Kim, Suwon-si (KR); Chulyong Cho, Suwon-si (KR); Seokho Ban, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/139,697

(22) Filed: Apr. 26, 2023

(65) Prior Publication Data

US 2023/0260434 A1  Aug. 17, 2023

Related U.S. Application Data

(63) Continuation of application No. PCT/KR2022/008549, filed on Jun. 16, 2022.

(30) Foreign Application Priority Data

Jun. 16, 2021  (KR) .................. 10-2021-0078319

(51) Int. Cl.
```
G09G 3/00       (2006.01)
G03B 21/20      (2006.01)
H05B 45/12      (2020.01)
```
(52) U.S. Cl.
CPC ......... G09G 3/002 (2013.01); G03B 21/2013 (2013.01); G03B 21/2033 (2013.01);
(Continued)

(58) Field of Classification Search
CPC ............ G03B 21/2053; G03B 21/2033; G09G 2320/0626; G09G 2360/144; G09G 2320/0666; G09G 3/002
See application file for complete search history.

(56) References Cited

U.S. PATENT DOCUMENTS

| 8,581,921 B2 | 11/2013 | Katahira |
| 9,332,237 B2 | 5/2016 | Shinha et al. |

(Continued)

FOREIGN PATENT DOCUMENTS

| CN | 109540465 A | * | 3/2019 | ............ G01M 11/00 |
| CN | 110185959   | * | 8/2019 | ............ F21S 10/00 |

(Continued)

OTHER PUBLICATIONS

International Search Report (PCT/ISA/210) issued by the International Searching Authority on Sep. 23, 2022 in International Application No. PCT/KR2022/008549.

(Continued)

*Primary Examiner* — Matthew A Eason
*Assistant Examiner* — Scott D Au
(74) *Attorney, Agent, or Firm* — Sughrue Mion, PLLC

(57) ABSTRACT

An electronic apparatus and a control method thereof are provided. The electronic apparatus includes a projector, a memory configured to store instructions and a processor configured to execute the instructions to control the projector to operate in a projection mode in which the projector projects light at a first brightness to project a first image, detect an event while operating in the projection mode, enter a lighting mode based on the detected event, and control, based on entering the lighting mode, the projector to project light at a second brightness which is less than the first brightness.

14 Claims, 19 Drawing Sheets

(52) U.S. Cl.
CPC ..... *H05B 45/12* (2020.01); *G09G 2320/0626* (2013.01); *G09G 2320/0666* (2013.01); *G09G 2360/145* (2013.01)

(56) References Cited

U.S. PATENT DOCUMENTS

| | | | |
|---|---|---|---|
| 9,366,420 | B2 | 6/2016 | Kasuga |
| 9,494,847 | B2 | 11/2016 | Kitahira |
| 9,907,144 | B2 | 2/2018 | Kawamura et al. |
| 10,197,233 | B2 | 2/2019 | Ono et al. |
| 10,412,815 | B2 | 9/2019 | Chen et al. |
| 11,960,103 | B2 * | 4/2024 | Shibuya ................ G03F 7/0005 |
| 2006/0002109 | A1 * | 1/2006 | Imade .................. H04N 9/3114 362/253 |
| 2007/0064203 | A1 * | 3/2007 | Sawai .................. H04N 9/3155 353/97 |
| 2011/0050663 | A1 * | 3/2011 | Katahira ................ G09G 5/02 345/207 |
| 2012/0092630 | A1 * | 4/2012 | Furuichi ............ G03B 21/2086 353/121 |
| 2013/0163232 | A1 | 6/2013 | Kasuga |
| 2013/0342817 | A1 | 12/2013 | Katahira |
| 2015/0022788 | A1 | 1/2015 | Shinha et al. |
| 2016/0270189 | A1 | 9/2016 | Kawamura et al. |
| 2018/0156401 | A1 | 6/2018 | Ono et al. |

FOREIGN PATENT DOCUMENTS

| | | |
|---|---|---|
| JP | 2011-53398 A | 3/2011 |
| JP | 2013-152922 A | 8/2013 |
| JP | 5320754 B2 | 10/2013 |
| JP | 2015-22201 A | 2/2015 |
| JP | 2016-170972 A | 9/2016 |
| JP | 2019-74597 A | 5/2019 |
| JP | 6550834 B2 | 7/2019 |
| KR | 10-1989-0008650 A | 7/1989 |
| KR | 20-0200290 Y1 | 10/2000 |
| KR | 10-2006-0104806 A | 10/2006 |
| KR | 10-2015-0120196 A | 10/2015 |
| KR | 10-2011179 B1 | 8/2019 |
| WO | 2014/099499 A1 | 6/2014 |
| WO | 2016/103517 A1 | 8/2017 |

OTHER PUBLICATIONS

Written Opinion (PCT/ISA/237) issued by the International Searching Authority on Sep. 23, 2022 in International Application No. PCT/KR2022/008549.

Communication dated Jul. 31, 2024, issued by the Korean Intellectual Property Office in Korean Application No. 10-2021-0078319.

Communication dated Apr. 28, 2025 issued by the Korean Intellectual Property Office in Korean Patent Application No. 10-2021-0078319.

* cited by examiner

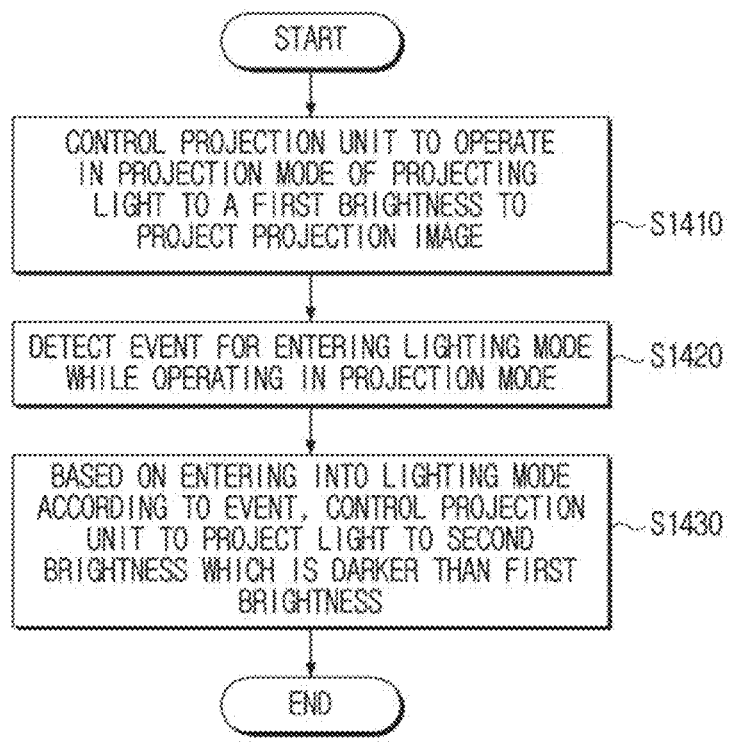

ELECTRONIC APPARATUS AND CONTROL METHOD THEREOF

CROSS-REFERENCE TO RELATED APPLICATION(S)

This application is a continuation application of International Application No. PCT/KR2022/008549, filed on Jun. 16, 2022 in the Korean Intellectual Property Receiving Office, which is based on and claims priority to Korean Patent Application Number 10-2021-0078319, filed on Jun. 16, 2021, in the Korean Intellectual Property Office, the disclosures of which are incorporated by reference herein in their entireties.

BACKGROUND

1. Field

The disclosure relates to an electronic apparatus and a control method thereof. More particularly, the disclosure relates to an electronic apparatus projecting a projection image and a control method thereof.

2. Description of Related Art

With the development of technology, electronic apparatuses provided with various optical output functions are under development, and examples thereof may include a display apparatus, a lighting apparatus, a mobile communication apparatus, a projector, or the like. The projector may be an electronic apparatus in which an output light output from a light source is expanded and projected to a wall or a screen through a projection lens.

An electronic apparatus provided with a projector function of the related art includes an image picture output function and a sound delivery function with the aim of delivering content, and when not outputting an image, there has been a limit on expanding additional usability other than sound output. Accordingly, research for expanding the usability of the electronic apparatus provided with the projector function has been underway according to user demand.

SUMMARY

Aspects of the disclosure are to address at least the above-mentioned problems and/or disadvantages and to provide at least the advantages described below. Provided is an electronic device utilizing a projecting light as lighting and a control method thereof.

In accordance with an aspect of the disclosure, an electronic apparatus may include a projector, a memory configured to store instructions and a processor configured to execute the instructions to control the projector to operate in a projection mode in which the projector projects light at a first brightness to project a first image, detect an event while operating in the projection mode, enter a lighting mode based on the detected event, and control, based on entering the lighting mode, the projector to project light at a second brightness which is less than the first brightness.

The event may be a cover being coupled on the projector.

The electronic apparatus may further include a color sensor or an illuminance sensor, and the processor may be further configured to execute the instructions to detect whether the cover is coupled on the projector based on first illuminance information detected by the illuminance sensor or color information detected by the color sensor.

The processor may be further configured to execute the instructions to: obtain, based on entering the lighting mode according to the event, second illuminance information of a home through the illuminance sensor, and control the projector to adjust the second brightness based on the obtained second illuminance information.

The cover may include a plurality of diffusion plates.

The processor may be further configured to execute the instructions to: obtain, based on entering the lighting mode according to the event, color information corresponding to the cover, and control the projector to project light of a color corresponding to the obtained color information at the second brightness.

The processor may be further configured to execute the instructions to: obtain, based on entering the lighting mode according to the event, color information of the first image projected while the projector operates in the projection mode, and control the projector to project light of a color corresponding to the obtained color information at the second brightness.

The processor may be further configured to execute the instructions to: obtain, based on entering the lighting mode according to the event, information on a music content which a user terminal is playing back, and control, based on the obtained information on the music content, the projector to project a second image corresponding to the music content at the second brightness.

The projector may include a plurality of light-emitting diode (LED) devices, and the processor may be further configured to execute the instructions to control the projector to project light at the second brightness by controlling an operating number of the plurality of LED devices.

The projector may include a plurality of light-emitting diode (LED) devices, and the processor may be further configured to execute the instructions to control the projector to project light at the second brightness by controlling a driving current of the plurality of LED devices.

In accordance with an aspect of the disclosure, a control method of an electronic apparatus may include controlling a projector to operate in a projection mode in which the projector projects light at a first brightness to project a first image, controlling a projector to operate in a projection mode in which the projector projects light at a first brightness to project a first image, entering a lighting mode based on the detected event, and controlling, based on entering the lighting mode, the projector to project light at a second brightness which is less than the first brightness.

The event may be a cover being coupled on the projector.

The control method may further include detecting whether the cover is coupled on the projector based on first illuminance information detected by an illuminance sensor or color information detected by a color sensor.

The control method may further include: obtaining, based on entering the lighting mode according to the event, second illuminance information of a home through the illuminance sensor; and controlling the projector to adjust the second brightness based on the obtained second illuminance information.

The cover may include a plurality of diffusion plates.

Through the various example embodiments described above and below, the electronic apparatus may be configured to utilize the projecting light as lighting and usability of the electronic apparatus may be expanded.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 14 is a flowchart illustrating a control method of an electronic apparatus according to an embodiment.

DETAILED DESCRIPTION

The disclosure will be described in greater detail below with reference to the drawings.

Figure 1:
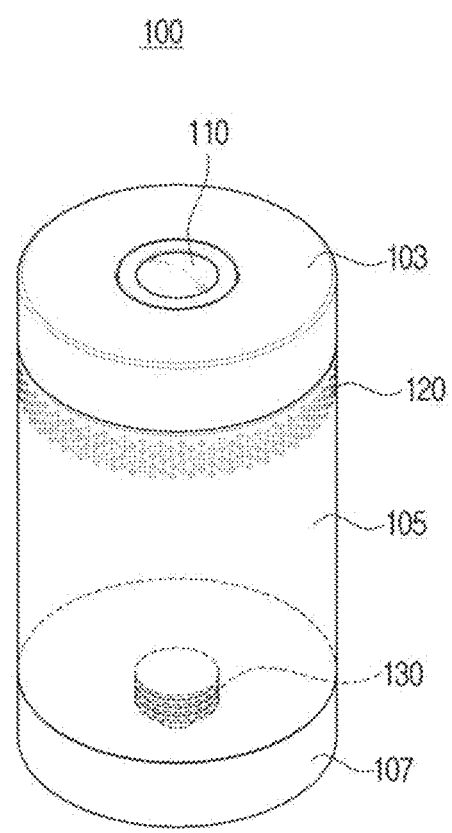
FIG. 1 is a diagram illustrating an exterior of an electronic apparatus according to an embodiment.

FIG. 1 is a diagram illustrating an exterior of an electronic apparatus 100 according to an embodiment. Referring to FIG. 1, the electronic apparatus 100 may include a head 103, a main body 105, a projection lens 110, a connector 130 or a lower cover 107.

The electronic apparatus 100 may be an apparatus of various forms. The electronic apparatus 100 may be a projector apparatus which enlarges and projects an image to a wall or a screen, and the projector apparatus may be a digital light processing (DLP) method projector configured to use a liquid crystal display (LCD) projector or a digital micromirror device (DMD).

In addition, the electronic apparatus 100 may be a display apparatus for home use or for industrial use, or may be a lighting apparatus used in daily life, or a sound apparatus which includes a sound module, and may be implemented as a mobile communication device (e.g., smartphone), a computer apparatus, a mobile multimedia apparatus, a wearable apparatus, a home appliance apparatus, or the like. The electronic apparatus 100 according to an example embodiment may not be limited to the above-described devices, and the electronic apparatus 100 may be implemented as an electronic apparatus 100 included with two or more functions of the above-described devices. For example, the electronic apparatus 100 may be utilized as the display apparatus, the lighting apparatus, or the sound apparatus based on a projector function being turned-off, and a lighting function or a speaker function being turned-on according to an operation of a processor, and may be utilized as an artificial intelligence (AI) speaker including a microphone or a communication apparatus.

The main body 105 may be a housing comprising an exterior, and may support or protect a component part (e.g., configuration shown in FIG. 2) of the electronic apparatus 100 which is disposed in the main body 105. A shape of the main body 105 may include a structure similar to a cylindrical shape as illustrated in FIG. 1. However, the shape of the main body 105 is not limited thereto, and according to the various example embodiments, the main body 105 may be realized to various geometrical shapes such as a pillar, a cone, or a sphere having polygonal cross sections.

A size of the main body 105 may be a size which a user is capable of grasping or moving with one hand, and may be realized to an ultra-small shape so that carrying is convenient, and may be realized to a size mountable to a table or which may be coupled to the lighting apparatus.

A material of the main body 105 may be realized with a matt metal or a synthetic resin so that it is user fingerprint free or dust free, or the exterior of the main body 105 may be formed with a smooth gloss.

A friction area may be formed at a part of the area at the exterior of the main body 105 for the user to grasp and move on the main body 105. Alternatively, the main body 105 may be provided with a bent grasping part or support 108 (referring to FIG. 3) for the user to grasp in at least a part of the area.

The projection lens 110 may be formed at one surface of the main body 105, and may be formed to project light, which passed a lens array, to an outside of the main body 105. The projection lens 110 of the various example embodiments may be a low-dispersion coated optical lens for reducing chromatic aberration. The projection lens 110 may be a convex lens or a condensing lens, and the projection lens 110 of the example embodiment may adjust a position of a plurality of sub lenses to adjust a focal point.

The head 103 may be coupled to one surface of the main body 105, and may support and protect the projection lens 110. The head 103 may be coupled with the main body 105 to be swivelable from a pre-set angle range based on one surface of the main body 105.

The head 103 may be automatically or manually swiveled by the user or the processor to freely adjust the projection angle of the projection lens 110. Alternatively, the head 103 may be coupled with the main body 105 and include a neck which extends from the main body 105, and the head 103 may be flipped or tilted and adjust the projection angle of the projection lens 110.

The electronic apparatus 100 may be configured to project a light or an image to a desired position by adjusting a direction of the head 103 while the position and angle of the main body 105 are in fixed state and adjusting an output angle of the projection lens 110. In addition, the head 103 may include a handle for holding after rotating to a direction desired by the user.

At an outer circumferential surface of the main body 105, a plurality of openings 120 may be formed. An audio output from an audio output unit through the plurality of openings 120 may be output to the outside of the main body 105 of the electronic apparatus 100. The audio output unit may include a speaker, and the speaker may be used for general use such as playing back multimedia or recordings, speech output, or the like.

According to an example embodiment, inside the main body 105 may be provided with a heat dissipation fan, and when the heat dissipation fan is operated, air or heat inside the main body 105 may be discharged through the plurality of openings 120. Accordingly, the electronic apparatus 100 may be configured to discharge heat generated by the operation of the electronic apparatus 100 externally, and prevent the electronic apparatus 100 from overheating.

The connector 130 may be configured to transmit and receive electrical signals by connecting the electronic apparatus 100 with an external apparatus, or may be provided with electric power externally. According to an example embodiment, the connector 130 may be physically connected with the external apparatus. The connector 130 may include an input and output interface, and may connect communicatively with the external apparatus or be provided with electric power via wired or wireless means. For example, the connector 130 may include a high-definition multimedia interface (HDMI) connection terminal, a universal serial bus (USB) connection terminal, a secure digital (SD) card accommodating groove, an audio connection terminal or an electric power outlet, or may include a Bluetooth, a Wi-Fi or a wireless charging ad connecting module which connects wirelessly with the external apparatus.

In addition, the connector 130 may have a socket structure which is connected to an external lighting apparatus, and may be provided with electric power by being connected to a socket accommodating groove of the external lighting apparatus. The size and standard of the connector 130 of a socket structure may be variously realized taking into consideration an accommodating structure of the external apparatus to which the connector 130 may be coupled. For example, a diameter of a joining part of the connector 130 may be realized as 26 mm according to an E26 international standard, and in this case, the electronic apparatus 100 may be configured to substitute a light bulb which is generally used and may be coupled to the external lighting apparatus such as a stand. When fastening to an existing socket positioned at a ceiling, the electronic apparatus 100 may be a structure which is projected from top to bottom, and when the electronic apparatus 100 is not rotated because of the socket coupling, it may also be not possible to rotate the picture. Accordingly, even when power is provided by being socket coupled, the electronic apparatus 100 may be configured such that the head 103 is swiveled at one surface of the main body 105 while socket coupled to the stand in the ceiling so that the electronic apparatus 100 may be rotatable, and the picture may be emitted or the picture may be rotated to a desired position by adjusting the output angle.

The connector 130 may include a coupling sensor, and the coupling sensor may be configured to sense whether coupling is carried out with the connector 130 and the external apparatus, the coupled state or the subject of coupling, and transmit to the processor, and the processor may be configured to control the operation of the electronic apparatus 100 based on the received detection value.

The lower cover 107 may be coupled to and separated from the main body 105, and protect the connector 130 so that the connector 130 is not exposed to the outside at all times. The shape of the lower cover 107 may have a continued shape with the main body 105 as illustrated in FIG. 1, or may be realized to correspond to the shape of the connector 130. The lower cover 107 may be configured to support the electronic apparatus 100, and the electronic apparatus 100 may be coupled to the lower cover 107 and used coupled to or mounted to an external cradle.

The electronic apparatus 100 of various example embodiments may be provided with a battery inside the lower cover 107. The battery may include, for example, a non-rechargeable primary battery, a rechargeable secondary battery, or a fuel cell.

The electronic apparatus 100 may include a camera module, and the camera module may be configured to capture a still image and a moving image. According to an example embodiment, the camera module may include at least one lens, an image sensor, an image signal processor, or a flash.

The electronic apparatus 100 may include a protection case to protect and conveniently transport the electronic apparatus 100, or may include a stand supporting or fixing the main body 105 or a bracket capable of coupling to a partition.

In addition, the electronic apparatus 100 may be configured to use the socket structure to connect with the various external apparatuses and provide various functions. In an example embodiment, the electronic apparatus 100 may be configured to use the socket structure to connect with an external camera apparatus. The electronic apparatus 100 may be configured to provide an image stored in the connected camera apparatus or an image currently being captured by using a projection unit or projector 210. As another example embodiment, the electronic apparatus 100 may be configured to use the socket structure to connect with a battery module and may be provided with electric power. The electronic apparatus 100 may be connected with the external apparatus by using the socket structure, but this is merely one example embodiment, and may be connected with the external apparatus by using another interface (e.g., USB, etc.).

Figure 2:
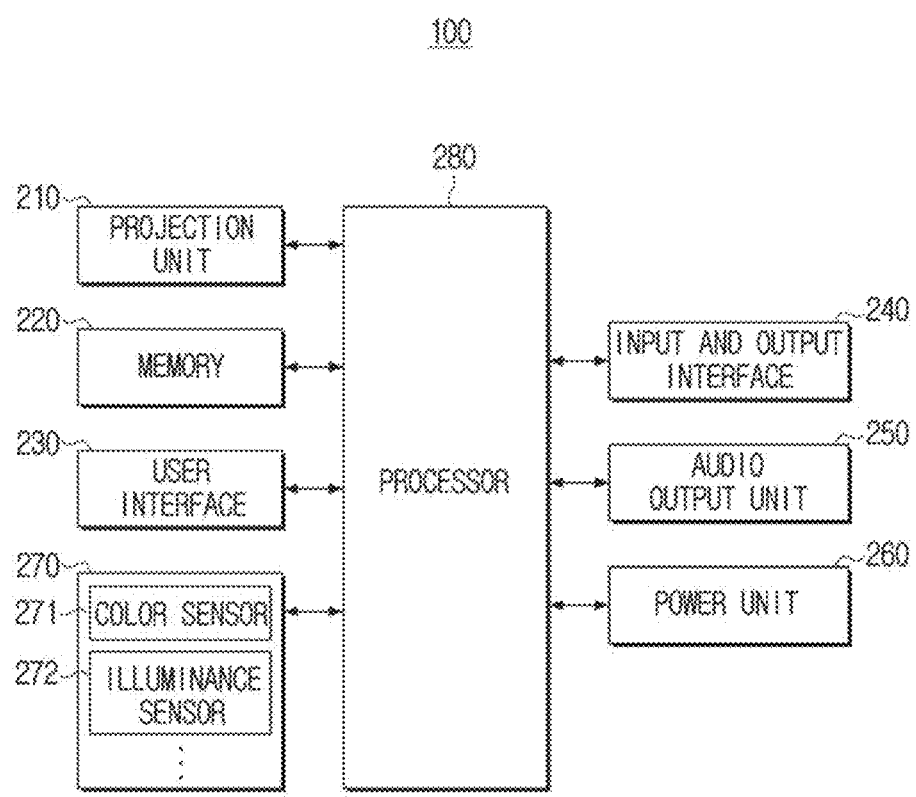
FIG. 2 is a diagram illustrating a configuration of an electronic apparatus according to an embodiment.

FIG. 2 is a diagram illustrating a configuration of an electronic apparatus according to an embodiment. As illustrated in FIG. 2, the electronic apparatus 100 may include a projection unit or projector 210, a memory 220, a UI 230, an input and output interface 240, an audio output unit 250, a power unit 260, a sensor unit 270, and a processor 280. The configurations illustrated in FIG. 2 are merely one example embodiment, and some configurations may be omitted and new configurations may be added.

The projection unit 210 may be a configuration which projects an image externally. According to an example embodiment, the projection unit 210 may be implemented in various projection methods (e.g., a CRT method, a LCD method, a DLP method, a laser method, etc.). As an example, the CRT method is generally same in principle as with a CRT monitor. The CRT method enlarges an image with a lens in front of CRT and displays the image on the screen. Based on a number of CRTs it may be divided into a 1-tube type and a 3-tube type, and in the case of the 3-tube type, a red, green and blue CRT may be divided separately and implemented.

In another example, the LCD method may be a method of displaying an image by transmitting light from a light source through liquid crystal. The LCD method may be divided into a single-panel type and a three-panel type, and in the case of the three-panel type, light from a light source may transmit liquid crystals after being separated to red, green and blue in a dichroic mirror (a mirror which reflects only light of a specific color and allows the rest to pass), and then light may be gathered again to one spot.

In another example, the DLP method may be a method of displaying an image by using a digital micromirror device (DMD) chip. The projection unit of the DLP method may include a light source, a color wheel, a DMD chip, a projection lens, and the like. The light output from the light source may show color as it passes the rotating color wheel. The light which passed the color wheel may be input to the DMD chip. The DMD chip may include numerous micromirrors, and reflect light input to the DMD chip. The projection lens may be configured to perform the role of expanding the light reflected from the DMD chip to an image size.

In still another example, the laser method may include a diode pumped solid state (DPSS) laser and a galvanometer. The laser which outputs various colors may use a special mirror after installing three DPSS lasers by the respective RGB colors to use a laser which superposed an optical-axis. The galvanometer includes a mirror and a motor of high output, and moves the mirror at a fast speed. For example, the galvanometer may rotate the mirror at a maximum of 40 KHz/sec. The galvanometer may be mounted long a scan direction, and because the projector generally planar scans, the galvanometer may be disposed divided in to an x-axis and a y-axis.

The projection unit 210 may include light sources of various types. For example, the projection unit 210 may include at least one light source from among a lamp, an LED or a laser.

Figure 7A:
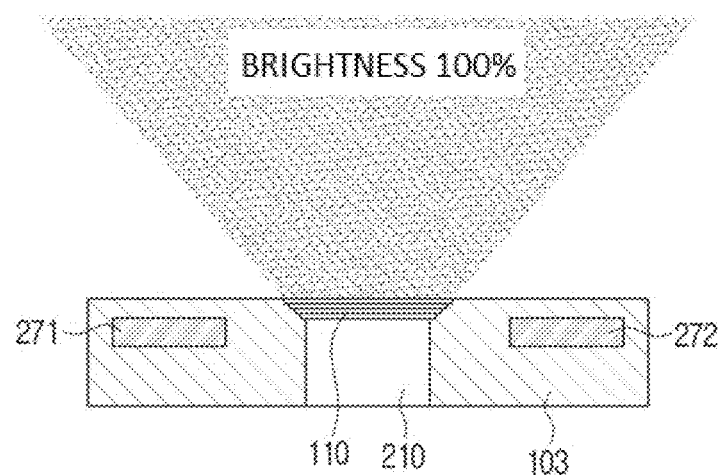
FIG. 7A is a diagram illustrating an embodiment of an electronic apparatus being operated in a projection mode according to an embodiment.
Figure 7B:
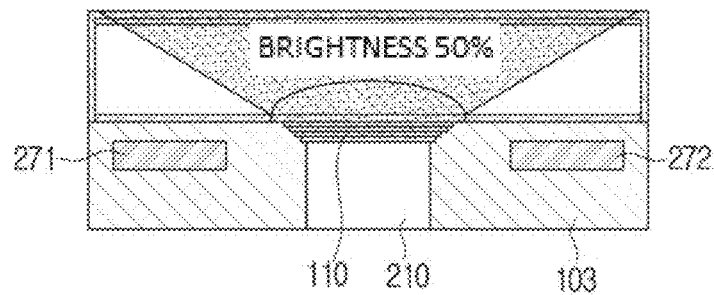
FIG. 7B is a diagram illustrating an embodiment of an electronic apparatus being operated in a lighting mode according to an embodiment.
Figure 7C:
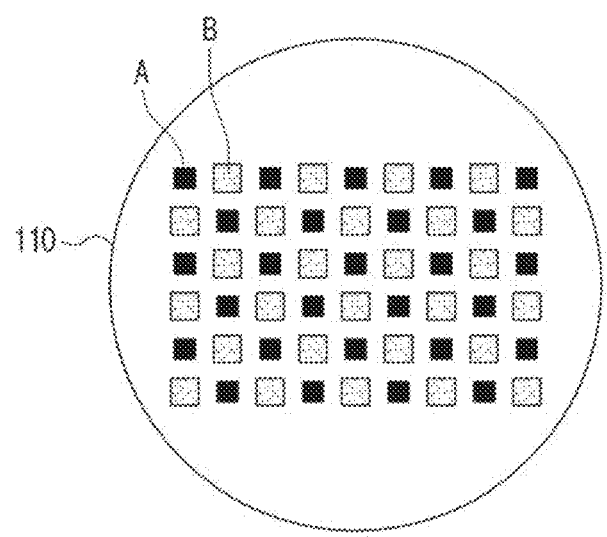
FIG. 7C is a diagram illustrating a plurality of light emitting diode (LED) devices outputting light according to an embodiment.

As an example, based on the light source of the projection unit 210 being realized as an LED, the projection unit 210 may include a plurality of LED devices as with FIG. 7C. That is, the light output from the plurality of LED devices may pass through the projection lens 110 and a projection image may be projected. In addition, the projection unit 210 may be configured to control a driving current of the plurality of LED devices to adjust a brightness of the projection image.

The projection unit 210 may be configured to output an image in an aspect ratio of 4:3, an aspect ratio of 5:4, a wide aspect ratio of 16:9 according to use, user setting, or the like of the electronic apparatus 100, and may output an image in various resolutions such as WVGA (854*480), SVGA (800*600), XGA (1024*768), WXGA (1280*720), WXGA (1280*800), SXGA (1280*1024), UXGA (1600*2200), and Full HD (1920*1080) according to the aspect ratio.

The projection unit 210 may be configured to perform various functions for adjusting an output image by the control of the processor 280. For example, the projection unit 210 may be configured to perform functions such as zoom, keystone, quick corner (4-corner) keystone, lens shift, and the like.

The projection unit 210 may enlarge or reduce an image according to a distance (projection distance) with the screen. That is, the zoom function may be performed according to the distance with the screen. The zoom function may include a hardware method of adjusting a size of the picture by moving the lens and a software method of adjusting the size of the picture by cropping the image, or the like. When the zoom function is performed, adjustment of the image focal point may be necessary. For example, the method of adjusting the focal point may include a manual focusing method, an automatic method, or the like. The manual focusing method may refer to a method of adjusting the focal point manually, and the automatic method may refer a method of adjusting the focal point automatically using a motor embedded with the projector when the zoom function is performed. When performing the zoom function, the projection unit 210 may be configured to provide a digital zoom function through a software, and provide an optical zoom function of performing the zoom function by moving the lens through a driver.

In addition, the projection unit 210 may be configured to perform a keystone function. If a height to a front projection is off, the picture may be distorted toward the top or bottom. The keystone function may refer to a function of correcting a distorted picture. For example, if distortion occurs in a left and right direction of the picture, the distortion may be corrected by using a horizontal keystone, and if distortion occurs in a top and bottom direction, the distortion may be corrected by using a vertical keystone. The quick corner (4-corner) keystone function may be a function of correcting the picture when balance in a center area of the picture is normal but an edge area is off. The lens shift function may be a function of moving the picture as is based on the picture deviating from the screen.

The projection unit 210 may be configured to analyze a surrounding environment and a projection environment automatically without user input and provide the zoom/keystone/focus function. The projection unit 210 may be configured to automatically provide the zoom/keystone/focus function based on the distance with the electronic apparatus 100 and the screen, information on a space in which the electronic apparatus 100 is currently positioned, information on an amount of surrounding light, and the like detected through a sensor (e.g., a depth camera, a distance sensor, an infrared sensor, an illuminance sensor, etc.).

In addition, the projection unit 210 may be configured to use the light source to provide the lighting function. The projection unit 210 may be configured to provide the lighting function by outputting the light source using the LED. According to an example embodiment, the projection unit 210 may include one LED, and according to another example embodiment, the electronic apparatus may include a plurality of LEDs. The projection unit 210 may be configured to use a surface-emitting LED to output the light source according to an implementation example. The surface-emitting LED may refer to an LED having a structure of an optical sheet being disposed at an upper side of the LED so that the light source may be evenly dispersed and output. Based on the light source being output through the LED, the light source may be evenly dispersed passing through the optical sheet, and the light source dispersed through the optical sheet may be incident to a display panel.

The projection unit 210 may be configured to provide a dimming function for adjusting an intensity of light source to the user. Based on receiving user input for adjusting the intensity of light source from the user through the UI 230 (e.g., a touch display button or a dial), the projection unit 210 may be configured to control the LED to output an intensity of light source which corresponds to the received user input.

In addition, the projection unit 210 may be configured to provide the dimming function based on the content analyzed by the processor 280 without the user input. The projection unit 210 may be configured to control the LED to output an intensity of light source based on information (e.g., content type, content brightness, etc.) on the content currently being provided.

The projection unit 210 may be configured to control a color temperature by the control of the processor 280. The processor 280 may be configured to control the color temperature based on the content. Based on identifying that the content is to be output, the processor 280 may be configured to obtain color information for respective frames of the content determined for output. Further, the processor 280 may be configured to control the color temperature based on the obtained color information for the respective frames. The processor 280 may be configured to obtain at least one main color of the frame based on the color information for the respective frames. Further, the processor 280 may be configured to adjust the color temperature based on the obtained at least one main color. For example, the color temperature which may be adjusted by the processor 280 may be divided into a warm type or a cold type. It may be assumed that the frame to be output (also referred to as an output frame) includes a scene in which fire occurs. The processor 280 may be configured to identify (or, obtain) the main color as red based on the color information included in the current output frame. Further, the processor 280 may be configured to identify the color temperature which corresponds to the identified main color (e.g., red). The color temperature which corresponds to red may be the warm type. The processor 280 may be configured to use an AI model to obtain the color information of the frame or the main color. According to an example embodiment, the AI model may be stored in the electronic apparatus 100 (e.g., memory 220). According to another example embodiment, the AI model may be stored in an external server capable of communication with the electronic apparatus 100.

The electronic apparatus 100 may be configured to operate in connection with an external device and control the lighting function. The electronic apparatus 100 may be configured to receive lighting information from the external device. The lighting information may include at least one from among brightness information or color temperature information set in the external device. The external device may refer to a device (e.g., an Internet of Things (IoT) device included in the same home/work network) connected to the same network as with the electronic apparatus 100 or a device (e.g., remote controlling server) capable of communicating with the electronic apparatus although not the same network as with the electronic apparatus 100. For example, it may be assumed that an external lighting device (e.g., IoT device) included in the same network as with the electronic apparatus 100 is outputting a red lighting at a brightness of 50. The external lighting device (e.g., IoT device) may be configured to directly or indirectly transmit lighting information (e.g., information showing that red lighting is being output at a brightness of 50) to the electronic apparatus 100. The electronic apparatus 100 may be configured to control the output of the light source based on lighting information received from the external lighting device. For example, based on the lighting information received from the external lighting device including information that red lighting is output at a brightness of 50, the electronic apparatus 100 may be configured to output the right lighting at the brightness of 50.

The electronic apparatus 100 may be configured to control the lighting function based on biometric information. The processor 280 may be configured to obtain the biometric information of the user. The biometric information may include at least one from among a temperature of the user, a number of heartrates, blood pressure, respiration, and an electrocardiogram. The biometric information may include various information in addition to the above-described information. As an example, the electronic apparatus may include a sensor for measuring the biometric information. The processor 280 may be configured to obtain the biometric information of the user through the sensor, and control the output of the light source based on the obtained biometric information. In another example, the processor 280 may be configured to receive biometric information from the external device through the input and output interface 240. The external device may refer to a mobile communication device (e.g., a smartphone or a wearable device) of the user. The processor 280 may be configured to obtain the biometric information of the user from the external device, and control the output of the light source based on the obtained biometric information. According to an implementation example, the electronic apparatus may be configured to identify whether the user is asleep, and if the user is identified as being asleep (or, preparing to sleep), the processor 280 may be configured to control the output of the light source based on the biometric information of the user.

The memory 220 may be stored with at least one instruction on the electronic apparatus 100. Further, the memory 220 may be stored with an operating system (O/S) for operating the electronic apparatus 100. In addition, the memory 220 may be stored with various software programs or applications for operating the electronic apparatus 100 according to the various example embodiments of the disclosure. Further, the memory 220 may include a semiconductor memory such as a flash memory or a magnetic storing medium such as a hard disk, and the like.

The memory 220 may be configured to store various software modules for operating the electronic apparatus 100 according to various example embodiments of the disclosure, and the processor 280 may be configured to control the operation of the electronic apparatus 100 by executing the various software modules stored in the memory 220. The memory 220 may be accessed by the processor 280, and reading/writing/modifying/deleting/updating of data by the processor 280 may be performed.

In the disclosure, the term "memory 220" may be used as a meaning which includes the memory 220, a read only memory (ROM) in the processor 280, a random access memory (RAM), or a memory card (e.g., a micro SD card, a memory stick) mounted to the electronic apparatus 100.

The UI 230 may include an input apparatus of various types. For example, the UI 230 may include a physical button. The physical button may include a function key, a direction key (e.g., 4-direction key), or a dial button. According to an example embodiment, the physical button may be realized as a plurality of keys. According to another example embodiment, the physical button may be realized as one key. Here, based on the physical button being realized as one key, the electronic apparatus 100 may be configured to receive the user input of the one key being pressed for a threshold time or more. Based on receiving the user input of the one key being pressed for the threshold time or more, the processor 280 may be configured to perform the function corresponding to the user input. For example, the processor 280 may be configured to provide the lighting function based on the user input.

In addition, the UI 230 may be configured to use a contact-free method to receive the user input. When receiving the user input through a touch method, physical force is to be transmitted to the electronic apparatus. Accordingly, a method for controlling the electronic apparatus regardless of physical force may be required. The UI 230 may be configured to receive a user gesture, and an operation corresponding to the received user gesture may be performed. The UI 230 may be configured to receive the gesture of the user through the sensor (e.g., an image sensor or an infrared sensor).

In addition, the UI 230 may be configured to use the touch method to receive the user input. For example, the UI 230 may be configured to receive the user input through a touch sensor. According to an example embodiment, the touch method may be realized to the touch-free method. For example, the touch sensor may be configured to determine whether a body of the user has approached within a threshold distance. The touch sensor may be configured to identify the user input even when the user has not contacted the touch sensor. According to another implementation example, the touch sensor may be configured to identify the user input of the user contacting the touch sensor.

The electronic apparatus 100 may be configured to receive the user input in various methods in addition to the above-described UI. In an example embodiment, the electronic apparatus 100 may be configured to receive the user input through an external remote controlling apparatus. The external remote controlling apparatus may be a remote controlling apparatus (e.g., electronic apparatus dedicated control device) corresponding to the electronic apparatus 100 or a mobile communication device (e.g., smartphone or wearable device) of the user. The mobile communication device of the user may be stored with applications for controlling the electronic apparatus. The mobile communication device may be configured to obtain the user input through the stored application, and the obtained user input may be transmitted to the electronic apparatus 100. The electronic apparatus 100 may be configured to receive the user input from the mobile communication device, and perform an operation corresponding to the control command of the user.

The electronic apparatus 100 may be configured to receive the user input by using voice recognition. According to an example embodiment, the electronic apparatus 100 may be configured to receive a user voice through the microphone included in the electronic apparatus. According to another example embodiment, the electronic apparatus 100 may be configured to receive the user voice from the microphone or the external apparatus. The external apparatus may be configured to obtain the user voice through a microphone of the external apparatus, and transmit the obtained user voice to the electronic apparatus 100. The user voice transmitted from the external apparatus may be audio data or the audio data converted digital data (e.g., audio data or the like converted to frequency domain). The electronic apparatus 100 may be configured to perform an operation corresponding to the received user voice. The electronic apparatus 100 may be configured to receive audio data corresponding to the user voice through the microphone. Further, the electronic apparatus 100 may be configured to convert the received audio data to digital data. Further, the electronic apparatus 100 may be configured to use a speech to text (STT) function to convert the converted digital data to text data. According to an example embodiment, the STT function may be performed directly from the electronic apparatus 100, According to another example embodiment, the STT function may be performed in an external server. The electronic apparatus 100 may be configured to transmit digital data to the external server. The external server may be configured to convert digital data to text data, and obtain control instruction data based on the converted text data. The external server may be configured to transmit the control instruction data (text data may also be included) to the electronic apparatus 100. The electronic apparatus 100 may be configured to perform an operation corresponding to the user voice based on the obtained control instruction data.

The electronic apparatus 100 may be configured to use one assistance (or, AI assistant; e.g., Bixby™, etc.) to provide a voice recognition function, but this is merely one example embodiment, and may provide the voice recognition function through a plurality of assistances. The electronic apparatus 100 may be configured to select one from among the plurality of assistances based on a trigger word corresponding to the assistance or a specific key present on a remote controller and provide the voice recognition function.

The electronic apparatus 100 may be configured to use a screen interaction to receive the user input. The screen interaction may refer to a function of identifying, by the electronic apparatus, whether a predetermined event has occurred through an image projected to the screen (or, projection surface), and obtaining the user input based on the predetermined event. The predetermined event may refer to an event at which an object predetermined to a specific position is identified at the specific position (e.g., position at which the UI for receiving user input is projected). The predetermined object may include at least one from among a part of the body of the user (e.g., finger), a pointer, or a laser pointer. The electronic apparatus 100 may be configured to identify, based on the predetermined object being identified at the position corresponding to the projected UI, the user input of selecting the projected UT as being received. For example, the electronic apparatus 100 may be configured to project a guide image so that the UT is displayed in the screen. Further, the electronic apparatus 100 may be configured to identify whether the user selected the projected UT. The electronic apparatus 100 may be configured to identify, based on the predetermined event being identified at the position of the projected UI, the user as having selected the projected UI. The projected UI may include at least one item. The electronic apparatus 100 may be configured to perform a spatial analysis to identify whether the predetermined event is at the position of the projected UI. The electronic apparatus 100 may be configured to perform the spatial analysis through the sensor (e.g., image sensor, infrared sensor, depth camera, distance sensor, etc.). The electronic apparatus 100 may be configured to identify whether the predetermined event has occurred at the specific position (the position at which the UI is projected) by performing the spatial analysis. Further, based on identifying that the predetermined event has occurred at the specific position (the position at which the UI is projected), the electronic apparatus 100 may be configured to identify that the user input for selecting the UI corresponding to the specific position has been received.

The input and output interface 240 may be a configuration for inputting and outputting at least one from among the audio signal and the image signal. The input and output interface 240 may be configured to receive input of at least on from among the audio and image signals from the external apparatus, and output a control instruction to the external apparatus.

The input and output interface 240 of the example embodiment may be realized as at least one wired input and output interface from among a HDMI, a Mobile High-Definition Link (MHL), a USB, a USB C-type, a Display Port (DP), a Thunderbolt, a Video Graphics Array (VGA) port, a RGB port, a D-subminiature (D-SUB), and a Digital Visual Interface (DVI). According to an example embodiment, the wired input and output interface may be realized as an interface which inputs and outputs only the audio signal and an interface which inputs and outputs only the image signal, or as one interface which inputs and outputs both the audio signal and the image signal.

In addition, the electronic apparatus 100 may be configured to receive data through the wired input and output interface, but this is merely one example embodiment, and may be provided with electric power through the wired input and output interface. For example, the electronic apparatus 100 may be provided with electric power from an external battery through the USB C-type, or be provided with electric power from an output through a power adaptor. In another example, the electronic apparatus may be provided with electric power from an external apparatus (e.g., a notebook or monitor, etc.) through the DP.

The input and output interface 240 of the example embodiment may be realized as a wireless input and output interface performing communication in at least one communication method from among the communication methods of Wi-Fi, Wi-Fi direct, Bluetooth, ZigBee, 3rd Generation (3G), 3rd Generation Partnership Project (3GPP), Long Term Evolution (LTE), 5th Generation (5G), etc. According to the implementation example, the wireless input and output interface may be realized as an interface which inputs and outputs only the audio signal and an interface which inputs and outputs only the image signal, or as one interface which inputs and outputs both the audio signal and the image signal.

In addition, it may be realized so that the audio signal is to be received through the wired input and output interface, and the image signal is to be received through the wireless input and output interface. Alternatively, it may be realized so that the audio signal is to be received through the wireless input and output interface, and the image signal is to be received through the wired input and output interface.

The audio output unit 250 may be a configuration for outputting the audio signal. The audio output unit 250 may include an audio output mixer, an audio signal processor, and a sound output module. The audio output mixer may be configured to synthesize a plurality of audio signals to be output as at least one audio signal. For example, the audio output mixer may be configured to synthesize an analog audio signal and another analog audio signal (e.g., an analog audio signal received externally) as at least one analog audio signal. The sound output module may include a speaker or an output terminal. The sound output module according to the example embodiment may include a plurality of speakers, and in this case, the sound output module may be disposed inside the main body, and the sound which covers at least a part of a diaphragm of the sound output module may pass a waveguide and be transferred outside the main body. The sound output module may include a plurality of sound output units, and because the plurality of sound output units is symmetrically disposed at the exterior of the main body, sound may be radiated in all directions, that is all 360-degree direction.

The power unit 260 may be provided with electric power from the outside, and provide electric power to various configurations of the electronic apparatus 100. The power unit 260 according to an example embodiment may be provided with electric power through various methods. In an example embodiment, the power unit 260 may be configured to use the connector 130 as illustrated in FIG. 1 to be provided with electric power. In addition, the power unit 260 may be configured to use a 220 V direct current (DC) power cord and be provided with electric power. However, the example embodiment is not limited thereto, and the electronic apparatus may be configured to use a USB power cord to be provided with electric power or use a wireless charging method to be provided with electric power.

In addition, the power unit 260 may be configured to use an internal battery or an external battery to be provided with electric power. The power unit 260 according to an example embodiment of the disclosure may be provided with electric power through the internal battery. As an example, the power unit 260 may be configured to use at least one from among the 220 V DC power cord, the USB power cord, and a USB C-type power cord to charge electric power of the internal battery and be provided with electric power through the charged internal battery. In addition, the power unit 260 according to an example embodiment may be provided with electric power through the external battery. As an example, based on connection of the electronic apparatus and the external battery being performed through various wired communication methods such as the USB power cord, the USB C-Type power cord, and a socket groove, the power unit 260 may be provided with electric power through the external battery. That is, the power unit 260 may be provided with electric power directly from the external battery, or by charging the internal battery through the external battery and be provided with electric power from the charged internal battery.

The power unit 260 according to an embodiment may be configured to use at least one from among a plurality of electric power providing methods described above to be provided with electric power.

With respect to electric power consumption, the electronic apparatus 100 may have an electric power consumption of less than or equal to a pre-set value (e.g., 43 W) for reasons such as a socket form, other standards, and the like. The electronic apparatus 100 may vary the electric power consumption so as to reduce electric power consumption when using the battery. That is, the electronic apparatus 100 may be configured to vary the electric power consumption based on a power supply method, an amount of electric power used, and the like.

The sensor unit 270 may be a configuration for detecting an operating environment, for example a brightness of the surrounding of the electronic apparatus 100, the color information, the temperature and humidity, and other lighting operations, of the electronic apparatus 100, or for recognizing a position, gesture, and a motion of the user.

The sensor unit 270 may include a switch sensor, an image sensor, a color sensor, a distance sensor, and an illuminance sensor according to the operation method. However, the embodiment is not limited thereto, and may include various types of sensors.

In an example embodiment, the sensor unit 270 may include the color sensor 271. The color sensor 271 may be positioned in the head 103 of the electronic apparatus 100 as illustrated in FIG. 7A and FIG. 7B, and may be a configuration for obtaining color information of the surrounding of the head 103.

In addition, in an example embodiment, the sensor unit 270 may include the illuminance sensor 272. The illuminance sensor 272 may be positioned in the head 103 of the electronic apparatus 100 as illustrated in FIG. 7A and FIG. 7B, and obtain the brightness information of the surrounding of the head 103 to detect the change in illuminance.

The processor 280 may be configured to control the overall operation of the electronic apparatus 100 by being electrically connected with the memory 220. The processor 280 may be configured to execute at least one instruction stored in the memory 220 and control the electronic apparatus 100.

The processor 280 may be configured to control the projection unit 210 to operate in the projection mode projecting light to a first brightness for projecting the projection image.

Figure 3A:
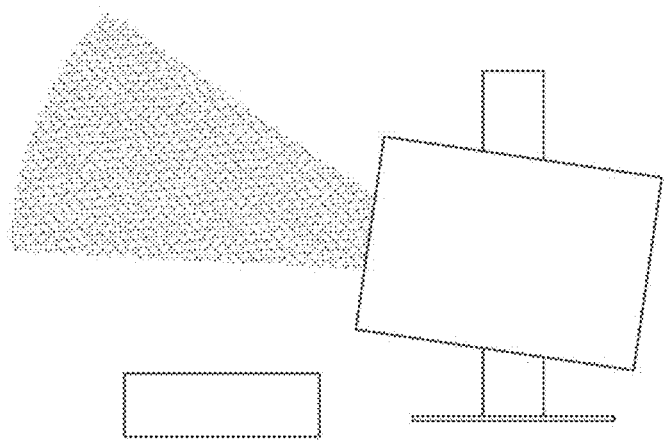
FIG. 3A is a diagram illustrating a projection mode according to an embodiment.

FIG. 3A is a diagram illustrating a projection mode according to an embodiment. The projection mode according to an embodiment may be a mode for the projection image to be displayed on the projection area to provide an image. That is, when operating in the projection mode, the head 103 of the electronic apparatus 100 may be positioned to face toward the projection area as in FIG. 3A, and the projection image may be displayed on the projection area.

That is, when the electronic apparatus 100 enters into the projection mode, the processor 280 may be configured to control the projection unit 210 to project the projection image to a first brightness.

The first brightness according to an embodiment may be a brightness of projecting the projection image while operating in the projection mode, and as an example, may be a maximum brightness which may be output by the projection unit 210. However, the embodiment is not limited thereto, and the first brightness may be adjusted according to the surrounding brightness detected through the sensor unit 270. Further, as an example, based on the light source of the projection unit 210 being realized as an LED, the processor 280 may be configured to control the projection unit 210 so that all of the plurality of LED devices included in the projection unit 210 outputs light while operating in the projection mode.

Further, the processor 280 may be configured to detect an event for entering into the lighting mode while operating in the projection mode.

Figure 3B:
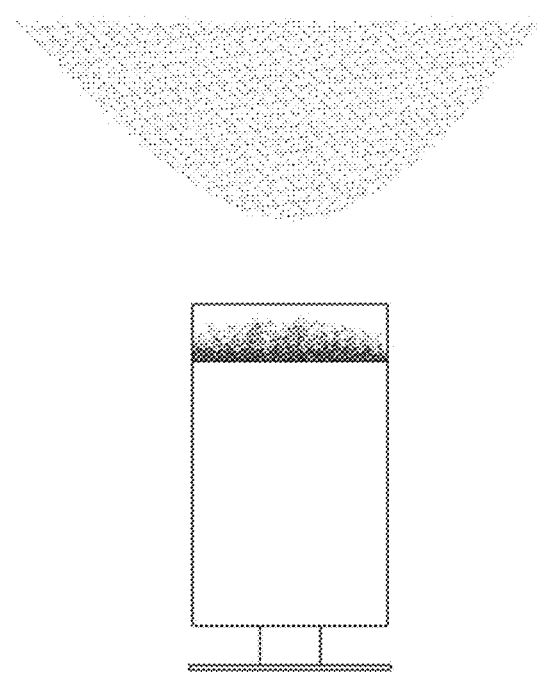
FIG. 3B is a diagram illustrating a lighting mode according to an embodiment.

FIG. 3B is a diagram illustrating a lighting mode according to an embodiment. The lighting mode according to an embodiment may be a mode for providing lighting in the surroundings of the electronic apparatus 100. That is, based on the cover which includes a diffusion plate for diffusing light being coupled on the projection unit 210 to which the light source is emitted as in FIG. 3B, the processor 280 may be configured to control the light source being output from the projection unit 210 and lighting may be provided. In an example embodiment, the light of a single color may be emitted, or the image corresponding to the lighting mode may be projected in the lighting mode. The detailed description thereof will be described below through the drawings.

As a first example embodiment, the event for entering into the lighting mode may include an event of the cover being coupled on the projection unit 210. The cover may be a configuration for diffusing light output from the projection unit 210, and the detailed description on the cover will be described through FIG. 6A and FIG. 6B.

When the cover is coupled on the projection unit 210 of the electronic apparatus 100, the processor 280 may be configured to detect the event for entering into the lighting mode, and enter into the lighting mode. That is, based on the cover being closely positioned on the projection unit 210, the color sensor 271 or the illuminance sensor 272 which is a configuration of the sensor unit 270 may sense whether the cover is close or coupled and provide to the processor 280, and the processor 280 may be configured to control the projection unit 210 so as to operate the electronic apparatus 100 in the lighting mode based on whether the cover is close or coupled.

The processor 280 according to an embodiment may be configured to identify, based on change in illuminance on the projection unit 210 being detected through illuminance information detected through the illuminance sensor 272, that an event of the cover being coupled on the projection unit 210 has occurred.

The processor 280 according to an embodiment may be configured to identify, based on a change in color on the projection unit 210 being detected through the color information detected through the color sensor 271, that an event of the cover being coupled on the projection unit 210 has occurred.

As a second example embodiment, the event for entering into the lighting mode may include an event of the user command for entering into the lighting mode being received after the cover is coupled on the projection unit 210. As an example, while the cover is coupled on the projection unit 210, the processor 280 may be configured to receive a voice command of the user for entering into the lighting mode and enter into the lighting mode. As an example, while the cover is coupled on the projection unit 210, the processor 280 may be configured to receive the user command for entering into the lighting mode from an external display apparatus connected with the electronic apparatus 100 and enter into the lighting mode.

As a third example embodiment, the event for entering into the lighting mode may include an event of an instruction for entering into the lighting mode being received from a master apparatus which manages the lighting apparatus within the home after the cover is coupled on the projection unit 210. As an example, based on the master apparatus identifying that lighting is to be provided through the electronic apparatus 100, the master apparatus may be configured to transmit an instruction for entering into the lighting mode through the electronic apparatus 100. Further, the processor 280 may be configured to receive an instruction for entering into the lighting mode from the master apparatus and control the projection unit 210 to operating in the lighting mode.

The event for entering into the lighting mode is not limited to the example embodiments described above and may further include various example embodiments.

Based on the electronic apparatus 100 entering into the lighting mode according to the event for entering into the lighting mode, the processor 280 may be configured to control the projection unit 210 to project light in a second brightness which is darker than the first brightness (i.e., the second brightness may be less than the first brightness in an amount of brightness measurement units).

The second brightness according to an embodiment may be a brightness of light being projected while operating in the lighting mode, and as an example, may be less than or equal to a predetermined ratio (e.g., 50%) than a maximum brightness which can be output by the projection unit 210. However, the example embodiment is not limited thereto, and the second brightness may be adjusted according to a surrounding brightness which is detected through the sensor unit 270.

In an example embodiment, based on the light source of the projection unit 210 being realized as an LED, the processor 280 may be configured to control, while operating in the lighting mode, an operating number of the plurality of LED devices included in the projection unit 210 to control the projection unit 210 to output light at the second brightness. That is, the processor 280 may be configured to control the projection unit 210 to output light by controlling a number ratio of the LED devices outputting light from among the plurality of LED devices included in the projection unit 210 to less than or equal to a predetermined ratio (e.g., 50%).

In an example embodiment, based on the light source of the projection unit 210 being realized as an LED, the processor 280 may be configured to control, while operating in the lighting mode, the projection unit 210 so as to output light in the second brightness by controlling a driving current of the plurality of LED devices included in the projection unit 210. That is, the processor 280 may be configured such that the driving current of the plurality of LED devices is controlled, and the projection unit 210 is controlled to output light at the second brightness which is darker than the first brightness.

Further, while operating in the lighting mode of light being output at the second brightness, the processor 280 may be configured to obtain illuminance information in the home through the illuminance sensor 272. Further, the processor 280 may be configured to control the projection unit 210 to adjust the second brightness based on the obtained illuminance information. The processor 280 may be configured to identify a change in illuminance in the home through the obtained illuminance information. Further, the processor 280 may be configured to control the projection unit 210 to adjust the second brightness according to the identified change in illuminance.

As an example, based on identifying that inside the home has become dark through the obtained illuminance information, the processor 280 may be configured to control the projection unit 210 to output light to a brighter brightness than the previous second brightness. As an example, when the inside of the home is identified as having become brighter through the obtained illuminance information, the processor 280 may be configured to control the projection unit 210 to output light at a brightness darker than the previous second brightness, or not output light.

Further, the lighting mode according to an embodiment may be configured to provide various lighting.

In an example embodiment, based on the electronic apparatus 100 entering into the lighting mode, the processor 280 may be configured to obtain color information corresponding to the cover. As an example, the processor 280 may be configured to obtain color information corresponding to the cover through the color sensor 271. Further, the processor 280 may be configured to control the projection unit 210 to project light of a color corresponding to the obtained color information at the second brightness. The detailed description thereof will be described below through FIG. 11A to FIG. 11C.

In an example embodiment, based on the electronic apparatus 100 entering into the lighting mode while operating in the projection mode, the processor 280 may be configured to obtain the color information of the projection image projected while operating in the projection mode. Further, the processor 280 may be configured to control the projection unit 210 to project light of a color corresponding to the obtained color information at the second brightness. The detailed description thereof will be described below through FIG. 12.

In an example embodiment, based on the electronic apparatus 100 entering into the lighting mode, the processor 280 may be configured to obtain information on a music content being played back by the user terminal which operates in connection with the electronic apparatus. Further, the processor 280 may be configured to control the projection unit 210 to project the projection image corresponding to the music content at the second brightness based on information on the obtained music content. The detailed description thereof will be described below through FIG. 13A.

The electronic apparatus 100 according to an example embodiment may be configured to provide various smart functions.

The electronic apparatus 100 may be connected with a mobile terminal apparatus for controlling the electronic apparatus 100 and a picture output from the electronic apparatus 100 may be controlled through the user input which is input from the mobile terminal apparatus. As an example, the mobile terminal apparatus may be realized as a smartphone including a touch display, and the electronic apparatus 100 may be configured output, by receiving from the mobile terminal apparatus, picture data provided from the mobile terminal apparatus, and control the picture being output from the electronic apparatus 100 according to user input which is input from the mobile terminal apparatus.

The electronic apparatus 100 may be configured to perform connection with the mobile terminal apparatus through various communication methods such as, Miracast, Airplay, wireless DEX, and a Remote personal computer (PC) method, and share the content or music provided from the mobile terminal apparatus.

Further, the mobile terminal apparatus and the electronic apparatus 100 may be configured to perform connection through various connection methods. In an example embodiment, a wireless connection may be performed by searching for the electronic apparatus 100 in the mobile terminal apparatus, or the wireless connection may be performed by search for the mobile terminal apparatus in the electronic apparatus 100. Further, the electronic apparatus 100 may be configured to output content which is provided from the mobile terminal apparatus.

In an example embodiment, when a predetermined gesture is detected (e.g., motion tap view) through a display of the mobile terminal apparatus after the mobile terminal apparatus is positioned close to the electronic apparatus while a specific content or music is being output from the mobile terminal apparatus, the electronic apparatus 100 may be configured to output content or music that is being output from the mobile terminal apparatus.

In an example embodiment, when the mobile terminal apparatus is at a distance of less than or equal to a pre-set distance with the electronic apparatus 100 (e.g., touch-free tap view) or the mobile terminal apparatus is contacted twice at short intervals with the electronic apparatus 100 (e.g., contact tap view) while outputting the specific content or music from the mobile terminal apparatus, the electronic apparatus 100 may be configured to output the content or music being output from the mobile terminal apparatus.

In the above-described example embodiment, although the picture which is the same as the picture being provided from the mobile terminal apparatus has been described as being provided from the electronic apparatus 100, the disclosure is not limited thereto. That is, when connection between the mobile terminal apparatus and the electronic apparatus 100 is established, a first picture which is provided from the mobile terminal apparatus may be output from the mobile terminal apparatus, and a second picture which is provided from a mobile terminal apparatus different from the first picture may be output from the electronic apparatus 100. As an example, the first picture may be a picture provided by a first application installed in the mobile terminal apparatus, and a second picture may be a picture provided by a second application installed in the mobile terminal apparatus. As an example, the first picture and the second picture may be different pictures provided from one application installed in the mobile terminal apparatus. In addition, as an example, the first picture may be a picture which includes a remote controller type UI for controlling the second picture.

The electronic apparatus 100 (e.g., an electronic device) according to an embodiment may be configured to output an idle picture. As an example, when connection with the external apparatus is not performed by the electronic apparatus 100 or when there is no input received for a predetermined time from the external apparatus, the electronic apparatus 100 may be configured to output an idle picture. The condition for the electronic apparatus 100 to output the idle picture is not limited to the above-described examples and the idle picture may be output by various conditions.

The electronic apparatus 100 may be configured to output an idle picture in a bluescreen form, but the disclosure is not limited thereto. As an example, the electronic apparatus 100 may be configured to obtain an atypical object by extracting only the form of a specific object from data received from the external apparatus, and output an idle picture including the obtained atypical object.

Figure 4:
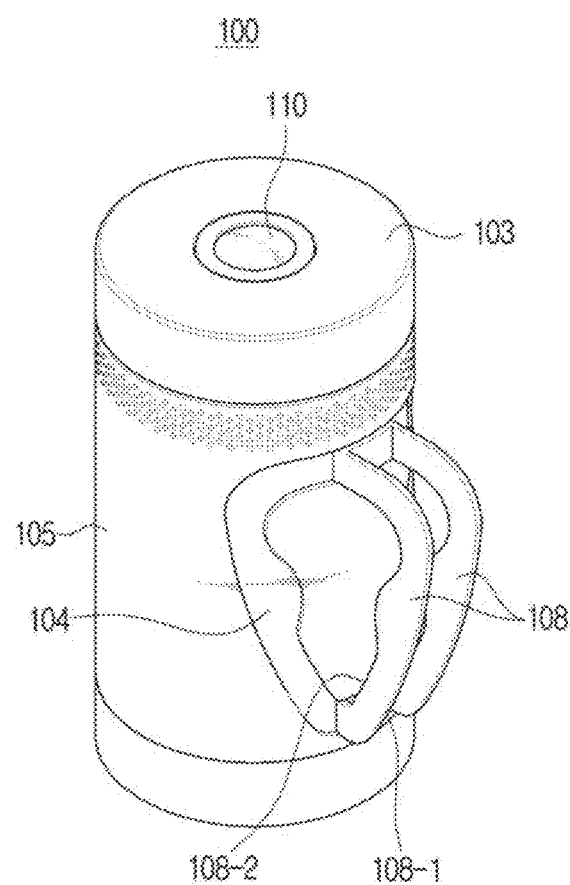
FIG. 4 is a diagram illustrating an exterior of an electronic apparatus according to an embodiment.

FIG. 4 is a diagram illustrating an exterior of the electronic apparatus 100 according to another embodiment. Referring to FIG. 4, the electronic apparatus 100 may include a support 108 (or, also referred to as a "handle").

The support 108 of the various example embodiments may be a handle or a hook provided for the user to grasp of move the electronic apparatus 100, or the support 108 may be a stand supporting the main body 105 while in a state in which the main body 105 is laid toward a side surface direction.

The support 108 may be connected in a hinge structure to couple to or separate from the outer circumferential surface of the main body 105 as illustrated in FIG. 4, and may be selectively separated from the outer circumferential surface of the main body 105 and fixed according to the necessity of the user. The number, shape or arrangement structure of the support 108 may be variously realized without limitation. The support 108 may be included inside of the main body 105 and used taken out by the user based on necessity, or the support 108 may be realized as a separate accessory and may be detachable to the electronic apparatus 100.

The support 108 may include a first support surface 108-1 and a second support surface 108-2. The first support surface 108-1 may be one surface facing an outward direction of the main body 105 while in a state the support is separated from the outer circumferential surface of the main body 105, and the second support surface 108-2 may be one surface facing an inside direction of the main body 105 while in a state the support is separated from the outer circumferential surface of the main body 105.

The first support surface 108-1 may be spread from a lower part of the main body 105 to the upper part of the main body and become farther from the main body 105, and the first support surface 108-1 may have a flat or uniformly curved shape. The first support surface 108-1 may be configured to support the main body 105, based on the electronic apparatus 100 being mounted so that an outer surface of the main body 105 is in contact with the bottom surface (i.e., based on the projection lens 110 being disposed to face a front surface direction). In an example embodiment which includes two or more supports 108, a distance or an open angle of a hinge of the two or more supports 108 may be adjusted to adjust the output angle of the head 103 and the projection lens 110.

The second support surface 108-2 may be a surface which is brought into contact with the user or an external mounting structure when the support 108 is supported by the user or the external mounting structure, and may have a shape corresponding to a user hand grasping structure or an external mounting structure so as to not slip when supporting or moving the electronic apparatus 100. The user may fix the head 103 and move the electronic apparatus 100 holding the support 108 by orientating the projection lens 110 to face the first surface direction, and use the electronic apparatus 100 like a flashlight.

The support groove 104 may be a groove structure provided in the main body 105 and capable of accommodating the support 108 when not in use, and may be realized as a groove structure corresponding to the shape of the support 108 at the outer circumferential surface of the main body 105 as illustrated in FIG. 4. When the support 108 is not used through a support groove 104, the support 108 may be stored at the outer circumferential surface of the main body 105, and the outer circumferential surface of the main body 105 may be smoothly maintained.

Alternatively, the support 108 may be stored inside the main body 105 and the support 108 may have a structure of being taken out to the outside of the main body 105 in a situation the support 108 is needed. In this case, the support groove 104 may be a structure inserted inside of the main body 105 to accommodate the support 108, and the second support surface 108-2 may be contacted to the outer circumferential surface of the main body 105 or include a door configured to open and close a separate support groove 104.

The electronic apparatus 100 may include accessories of various types configured to assist in the use or storage of the electronic apparatus 100, and for example, the electronic apparatus 100 may include a protection case (not shown) configured to protect and easily move the electronic apparatus 100, or include a bracket (not shown) capable of fixing the electronic apparatus 100 by being coupled to a tripod (not shown) or the outer surface to support or fix the main body 105.

Figure 5:
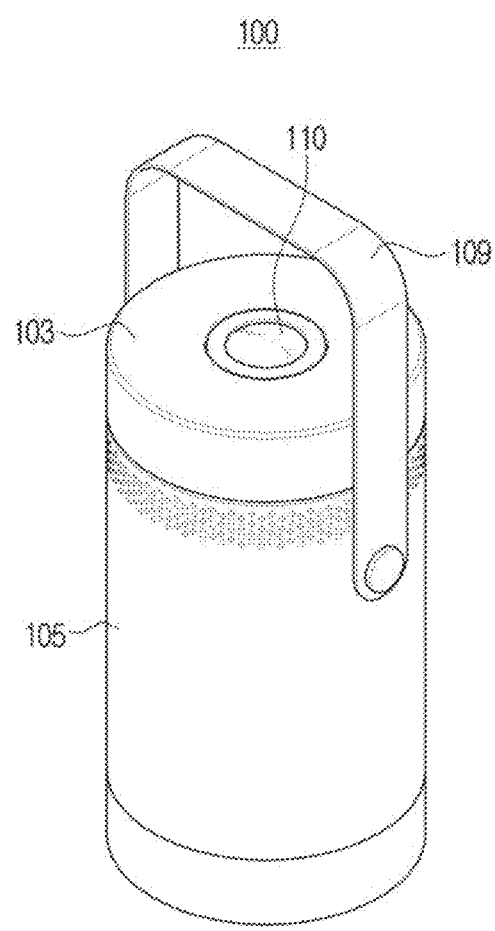
FIG. 5 is a diagram illustrating an exterior of an electronic apparatus according to still an embodiment.

FIG. 5 is a diagram illustrating the exterior of the electronic apparatus 100 according to an embodiment. Referring to FIG. 5, the electronic apparatus 100 may include the support 109 (or, also referred to as a "handle").

The support 109 of the various example embodiments may be a handle or a hook provided for the user to grasp or move the electronic apparatus 100, or the support 109 may be a stand configured to support the main body 105 so as to face an arbitrary angle while in a state the main body 105 is laid toward the side surface direction.

The support 109 may, as illustrated in FIG. 5, be connected with the main body 105 from the pre-set point (e.g., ⅔ to ¾ point) of the main body 105. Based on the support 109 being rotated toward a direction of the main body 105, the main body 105 may be supported toward an arbitrary angle while the main body 105 is in a laid state toward the side surface direction.

The support 108 illustrated in FIG. 4 and the support 109 illustrated in FIG. 5 are merely example embodiments, and the electronic apparatus 100 may be provided with the support 108 or the support 109 at various positions or in various forms.

Figure 6A:
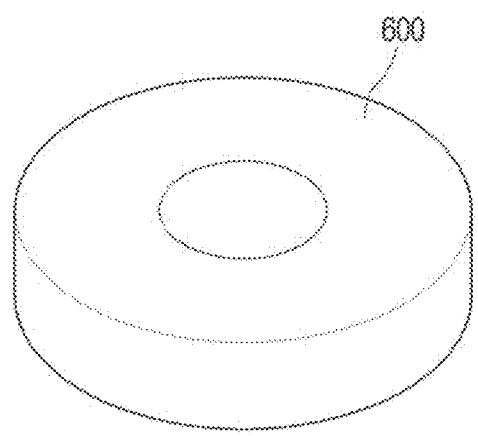
FIG. 6A is a diagram illustrating a cover which is coupled with an electronic apparatus according to an embodiment.
Figure 6B:
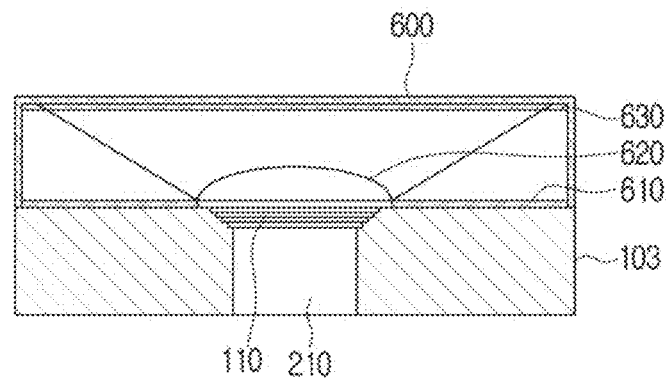
FIG. 6B is a diagram illustrating an example of a cover being coupled with an electronic apparatus according to an embodiment.

FIG. 6A is a diagram illustrating a cover which is coupled with an electronic apparatus according to an embodiment. FIG. 6B is a diagram illustrating an example of a cover being coupled with an electronic apparatus according to an embodiment.

The cover 600 may be selectively positioned to be close with or spaced apart from the projection lens 110, and may open and close the projection lens 110. The cover 600 may be positioned close with the projection lens 110 and may be positioned so that at least a part of an area is in contact or spaced apart, or the cover 600 may be positioned spaced apart from the projection lens 110 from a pre-set distance range and positioned such that it may become farther from or closer to the projection lens 110. As an example, the cover may be realized in the form of a lid or a cap.

According to an example embodiment, the cover 600 may be coupled to the head 103, but is not limited thereto, and may be selectively coupled to the main body 105 or the case of the main body 105. The cover 600 may become close with the projection lens 110 by being coupled with the head 103, and the cover 600 may be spaced apart from the projection lens 110 by being separated from the head 103.

When the cover is contact coupled to the head 103, or when the cover 600 and the projection lens 110 are closely coupled, the cover 600 may be configured to receive and diffuse light output from the projection lens 110 emit to the outside of the cover 600. The diffusion direction and emission direction of the cover 600 are not limited, and may diffuse output light omni-directionally to all areas, or may guide and diffuse the output light to a pre-set direction.

In an example embodiment, the cover 600 may include a plurality of diffusion plates for diffusing light output from the projection lens 110. The light projected from the electronic apparatus 100 through the diffusion plate may show the effect of being diffused like a typical lighting light.

Referring to FIG. 6B, the cover 600 according to an example embodiment of the disclosure may include three diffusion plates 610, 620 and 630. The first diffusion plate 610 of the cover 600 may be positioned at a lower surface of the cover 600 which is coupled with the head 103. Further, the second diffusion plate 620 of the cover 600 may be positioned on an area at which the projection lens 110 is positioned in the head 103 when the cover 600 is coupled with the head 103. Further, the third diffusion plate 630 of the cover 600 may be positioned at the upper surface of the cover 600. In addition, in an example embodiment, a height of the cover 600 may be realized as less than or equal to about 20 mm.

Further, based on the cover 600 coupling with the head 103, the light output from the projection unit 210 may pass the projection lens 110, and the light which passed the projection lens 110 may be sequentially passed through the first diffusion plate 610, the second diffusion plate 620, and the third diffusion plate 630, and through the light output from the projection unit 210 the lighting function may be provided.

However, the cover 600 according to an embodiment is not limited to the above-described examples, and may include one diffusion plate and not three, or may include two or four or more diffusion plates.

FIG. 7A is a diagram illustrating an embodiment of an electronic apparatus being operated in a projection mode according to an embodiment.

FIG. 7B is a diagram illustrating an embodiment of an electronic apparatus being operated in a lighting mode according to an embodiment.

FIG. 7C is a diagram illustrating a plurality of LED devices outputting light according to an embodiment.

Based on the electronic apparatus 100 and the cover 600 not being coupled, the electronic apparatus 100 may be configured to operate in the projection mode. That is, referring to FIG. 7A, the electronic apparatus 100 may be configured to project the projection image at the first brightness (e.g., brightness of 100%) through the projection unit 210 without the cover 600 coupled.

Further, based on the electronic apparatus 100 and the cover 600 being coupled, the electronic apparatus 100 may be configured to operate in the lighting mode. That is, referring to FIG. 7B, the electronic apparatus 100 may be configured to project light at the second brightness (e.g., brightness of 50%) through the projection unit 210 coupled with the cover 600.

According to an example embodiment, the electronic apparatus 100 may be configured to identify whether it is coupled with the cover 600 through the color sensor 271 or the illuminance sensor 272. The color sensor 271 and the illuminance sensor 272 may be positioned in the head 103, and may be positioned so as to detect color information or illuminance information of the direction the light is projected.

In an example embodiment, as in FIG. 7A, based on the cover 600 being coupled to the head 103 while operating in the projection mode, the electronic apparatus 100 may be configured to identify a change in illuminance based on illuminance information detected through the illuminance sensor 272. That is, when the cover 600 is coupled to the head 103, the electronic apparatus 100 may be configured to identify as the illuminance becoming darker through the illuminance sensor 272. Further, based on the change in illuminance, the electronic apparatus 100 may be configured to identify as the cover 600 being coupled to the head 103. Further, as in FIG. 7B, the electronic apparatus 100 may be configured to control the projection unit 210 to operate in the lighting mode.

In an example embodiment, as in FIG. 7A, based on the cover 600 being coupled to the head 103 while operating in the projection mode, the electronic apparatus 100 may be configured to identify a change in color based on color information detected through the color sensor 271. An example embodiment of providing lighting through a change in color identified through the color sensor 271 will be described below through FIG. 11A to FIG. 11B.

Further, based on entering into the lighting mode, the electronic apparatus 100 may be configured to control an operating number of the LED devices which output light to output light at the second brightness.

FIG. 7C is a diagram of a projection lens 110 viewed from a direction the light is projected.

When the light source which projects the projection image is realized as an LED in the electronic apparatus 100, the projection unit 210 may be configured to output light based on the plurality of LED devices. The light output from the plurality of LED devices may pass the projection lens 110 and the projection image may be projected.

In an example embodiment, while operating in the projection mode, light may be output from all of the plurality of LED devices (A and B). Further, while operating in the lighting mode, light may be output from some of the LED devices from among the plurality of LED devices. That is, referring to FIG. 7C, the electronic apparatus 100 may control so that the respective LED devices output light alternately while operating in the lighting mode. That is, the electronic apparatus 100 may be configured to control, based on light being output from a plurality of first LED devices A from among the plurality of LED devices, the plurality of LED devices so that light is not output from a plurality of second LED devices B from among the plurality of LED devices.

In an example embodiment, when entering into the lighting mode, the electronic apparatus 100 may be configured to control the plurality of LED devices so that light is output from the plurality of first LED devices A, and the plurality of second LED devices B from among the plurality of LED devices may be configured to control the plurality of LED devices so that light is not output. Further, when a predetermined time has passed while operating in the lighting mode, the electronic apparatus 100 may be configured to control the plurality of LED devices so that light is not output from the plurality of first LED devices A from among the plurality of LED devices, and the plurality of second LED devices B from among the plurality of LED devices may be configured to control the plurality of LED devices so that light is output.

In FIG. 7C, although it has been described as half of the LED devices from among the plurality of LED devices as outputting light alternately, the disclosure is not limited thereto, and devices of a predetermined ratio from among the plurality of LED devices may be controlled to output light alternately.

Figure 8:
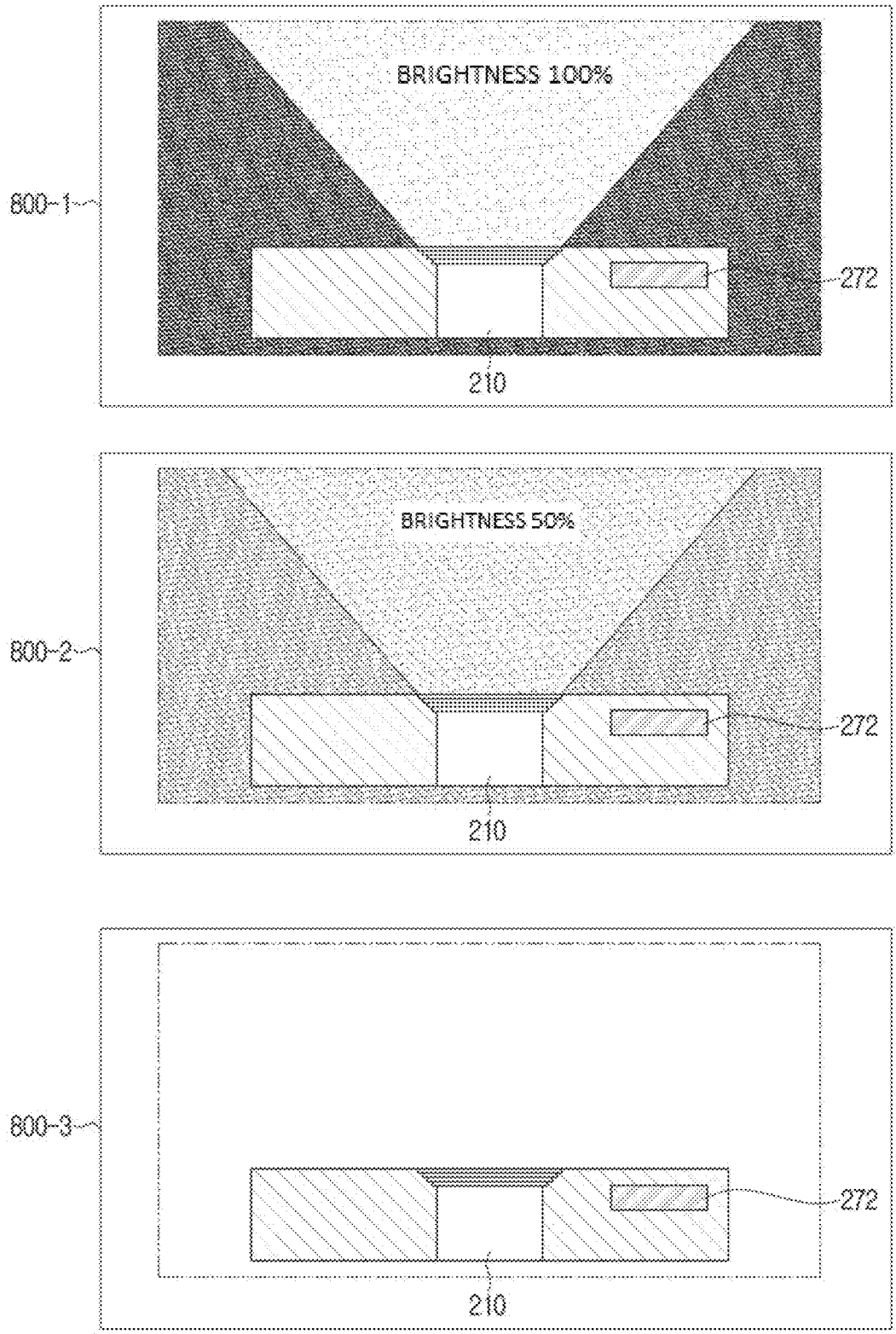
FIG. 8 is a diagram illustrating a projection mode according to an embodiment.

FIG. 8 is a diagram illustrating the projection mode according to an embodiment.

Referring to FIG. 8, the electronic apparatus 100 may be configured to control the brightness of light being output according to a change in the surrounding illuminance while being operated in the projection mode.

Referring to the first example embodiment 800-1 of FIG. 8, the electronic apparatus 100 may be configured to identify that the surrounding brightness of the electronic apparatus 100 is dark through the illuminance information obtained through the illuminance sensor 272. When the surrounding brightness of the electronic apparatus 100 is identified as dark, the electronic apparatus 100 may be configured to control the projection unit 210 to output light at a brightness of 100%.

Further, according to a second example embodiment 800-2 of FIG. 8, based on the surrounding brightness of the electronic apparatus 100 becoming relatively brighter (e.g., brighter by a predetermined ratio or more) than the first example embodiment 800-1, the electronic apparatus 100 may be configured to control the projection unit 210 to output light at a brightness of 50%.

Further, according to a third example embodiment 800-3 of FIG. 8, based on the surrounding brightness of the electronic apparatus 100 becoming relatively brighter (e.g., brighter by a predetermined ratio or more) than the second example embodiment 800-2, the electronic apparatus 100 may be configured to control the projection unit 210 to not output light.

According to an example embodiment of FIG. 8, the electronic apparatus 100 may be configured to control, based on the surroundings becoming brighter according to the change in illuminance obtained by using the illuminance sensor, so that the electronic apparatus 100 is not operated in the projection mode.

Figure 9:
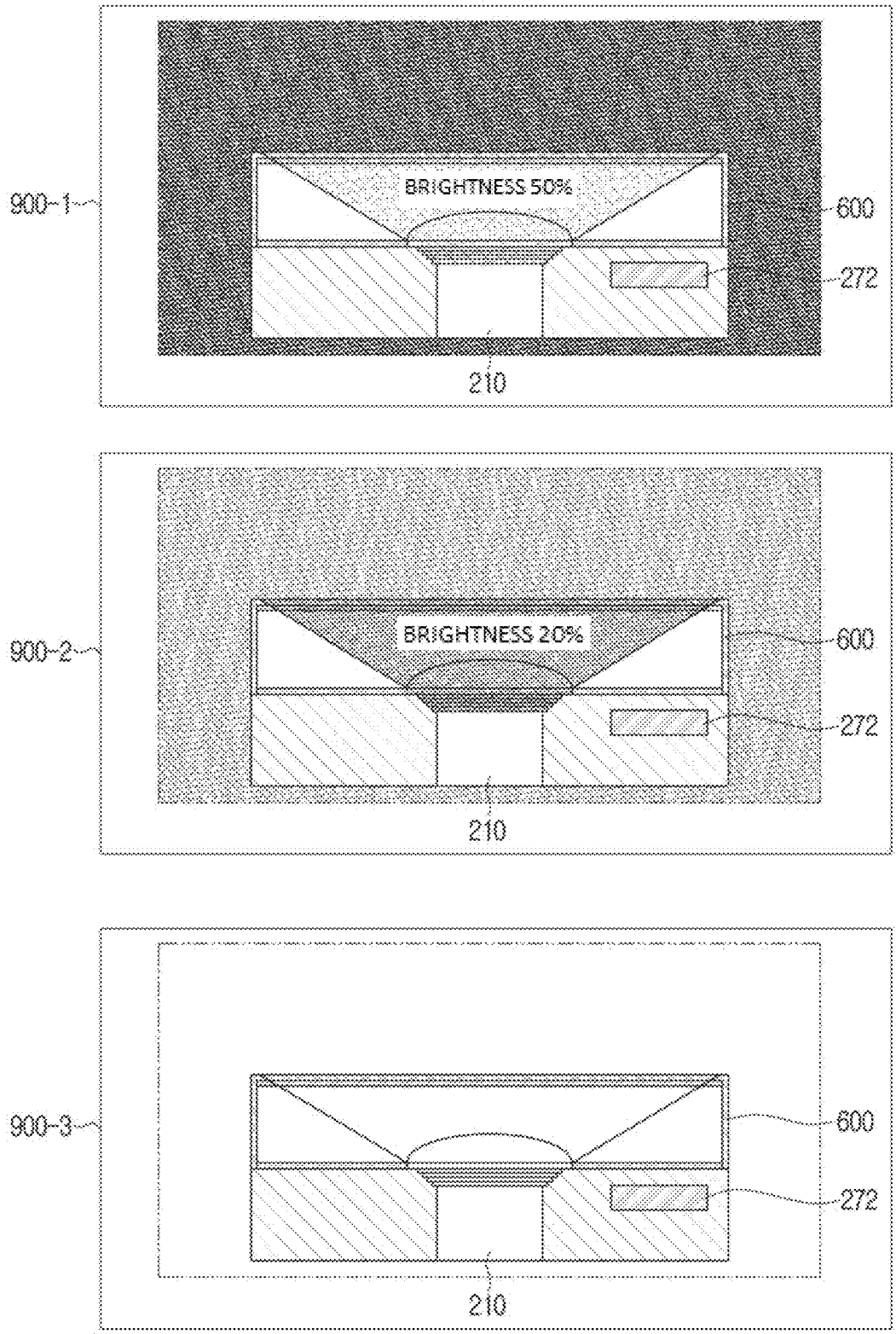
FIG. 9 is a diagram illustrating a lighting mode according to an embodiment.

FIG. 9 is a diagram illustrating the lighting mode according to an embodiment.

Referring to FIG. 9, the electronic apparatus 100 may be configured to control the brightness of light being output according to the change in surrounding illuminance while operating in the lighting mode.

Referring to a first example embodiment 900-1 of FIG. 9, the electronic apparatus 100 may be configured to identify the surrounding brightness of the electronic apparatus 100 as dark through the illuminance information obtained through the illuminance sensor 272 while operating in the lighting mode coupled with the cover 600. When the surrounding brightness of the electronic apparatus 100 is identified as dark, the electronic apparatus 100 may be configured to control the projection unit 210 to output light at a brightness of 50%.

Further, according to a second example embodiment 900-2 of FIG. 9, based on the surrounding brightness of the electronic apparatus 100 becoming relatively brighter (e.g., brighter by a predetermined ratio or more) than the first example embodiment 900-1, the electronic apparatus 100 may be configured to control the projection unit 210 to output light at a brightness of 20%.

Further, according to a third example embodiment 900-3 of FIG. 9, based on the surrounding brightness of the electronic apparatus 100 becoming relatively brighter (e.g., brighter by a predetermined ratio or more) than the second example embodiment 900-2, the electronic apparatus 100 may be configured to control the projection unit 210 to not output light.

According to an example embodiment of FIG. 9, the electronic apparatus 100 may be configured to provide lighting corresponding to the surrounding brightness according the change in illuminance obtained by using the illuminance sensor.

Figure 10:
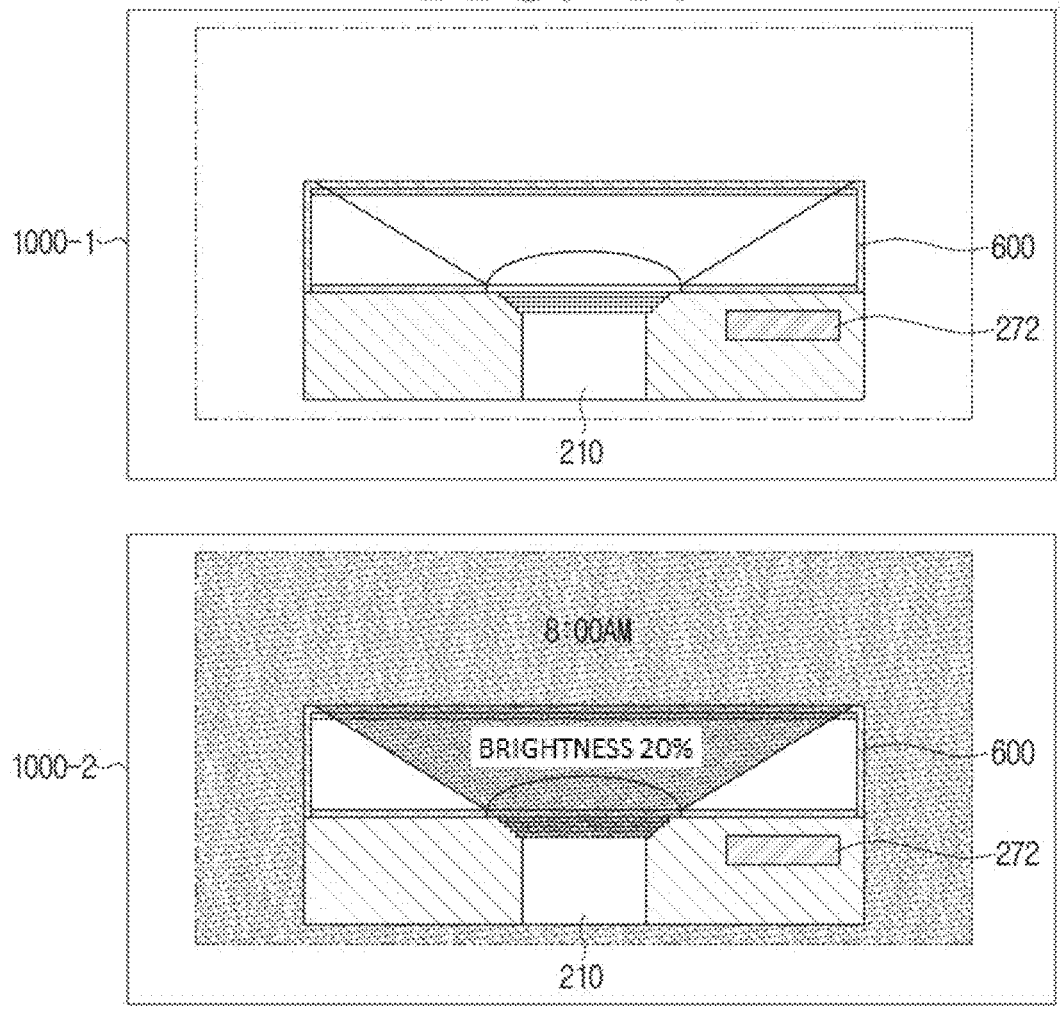
FIG. 10 is a diagram illustrating an alarm function provided by a lighting mode according to an embodiment.

FIG. 10 is a diagram illustrating an alarm function provided by the lighting mode according to an embodiment.

According an example embodiment, the lighting mode may be configured to provide an alarm function. When an alarm is set by the user terminal apparatus, the electronic apparatus 100 connected with the user terminal apparatus may be configured to output light so as to provide lighting at a time corresponding to the alarm. That is, based on the surroundings being dark as with a first example embodiment 1000-1 of FIG. 10, the electronic apparatus 100 may be configured to control the projection unit 210 to not output light. Further, when time corresponding to a pre-set alarm is reached as in a second example embodiment 1000-2 of FIG. 10, the electronic apparatus 100 may be configured to control the projection unit 210 to output light at a brightness of 20%.

The brightness (e.g., brightness of 100%, brightness of 50%, brightness of 20%, etc.) described in the example embodiments of FIG. 8 to FIG. 10 are not limited to the above-described examples, and may be controlled to various brightness.

Figure 11:
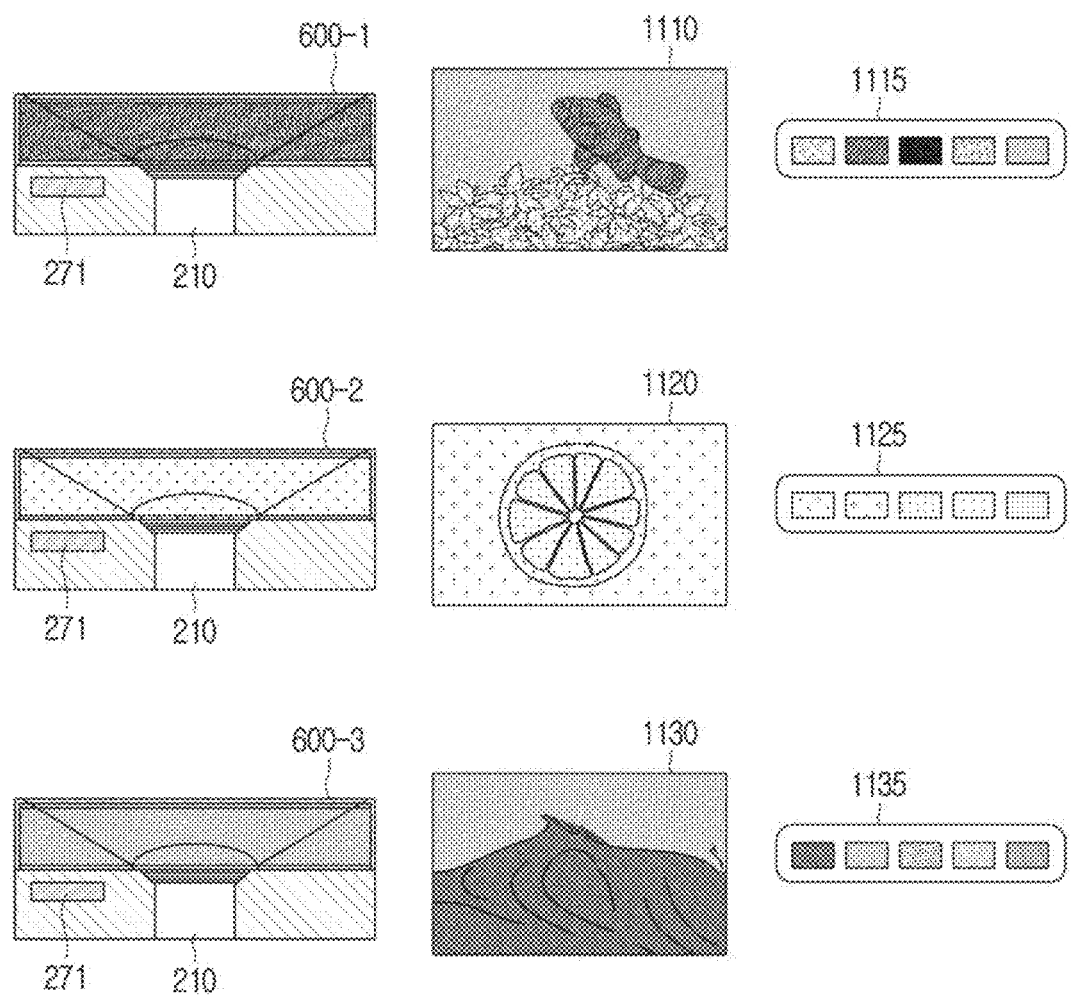
FIG. 11 is a diagram illustrating an example of a color and an image of lighting which is provided per color of a cover being different according to an embodiment.

FIG. 11 is a diagram illustrating an embodiment of a color and an image of lighting which is provided per color of a cover being different according to an embodiment.

The cover according to an embodiment may include a specific color.

A first cover 600-1 of FIG. 11 may include a red color. Further, the electronic apparatus 100 may be configured to receive, based on the first cover 600-1 being coupled, color information corresponding to the red color through the color sensor 271. Further, in an example embodiment, the electronic apparatus 100 may be configured to control the projection unit 210 to project an image 1110 corresponding to the red color. In another example embodiment, the electronic apparatus 100 may be configured to control the projection unit 210 to project light of a plurality of single colors 1115 corresponding to the red color in a serial or in a pre-set order. The plurality of single colors 1115 corresponding to the red color may be colors of the red series.

In addition, a second cover 600-2 of FIG. 11 may include an orange color. Further, the electronic apparatus 100 may be configured to receive, based on the second cover 600-2 being coupled, color information corresponding to the orange color through the color sensor 271. Further, in an example embodiment, the electronic apparatus 100 may be configured to control the projection unit 210 to project an image 1120 corresponding to the orange color. In another example embodiment, the electronic apparatus 100 may be configured to control the projection unit 210 to project light of a plurality of single colors 1125 corresponding to the orange color in a serial or in a pre-set order. The plurality of single colors 1125 corresponding to the orange color may be colors of the orange series.

In addition, a third cover 600-3 of FIG. 11 may include a blue color. Further, the electronic apparatus 100 may be configured to receive, based on the third cover 600-3 being coupled, color information corresponding to the blue color through the color sensor 271. Further, in an example embodiment, the electronic apparatus 100 may be configured to control the projection unit 210 to project an image 1130 corresponding to the blue color. In another example embodiment, the electronic apparatus 100 may be configured to control the projection unit 210 to project light of a plurality of single colors 1135 corresponding to the blue color in a serial or in a pre-set order. The plurality of single colors 1135 corresponding to the blue color may be colors of the blue series.

Figure 12:
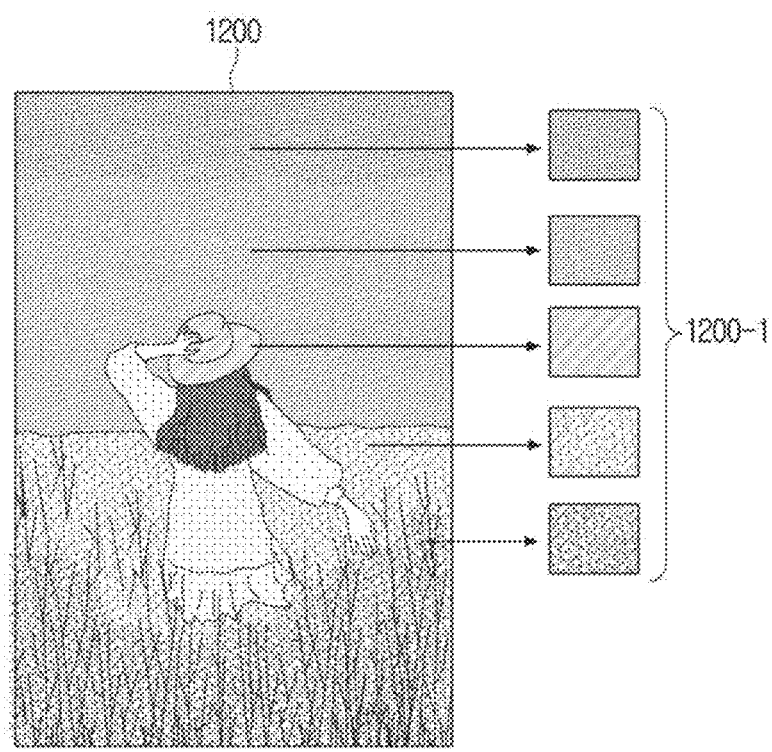
FIG. 12 is a diagram illustrating an example of a lighting mode being provided in a color corresponding to an image provided in a projection mode according to an embodiment.

FIG. 12 is a diagram illustrating an example of the lighting mode being provided in a color corresponding to an image provided in the projection mode according to an embodiment.

Referring to FIG. 12, the electronic apparatus 100 may be configured to project an image 1200 while operating in the projection mode. Further, based on the electronic apparatus 100 and the cover 600 being coupled and entering into the lighting mode while the image 1200 is being projected, electronic apparatus 100 may be configured to project light of the plurality of single colors 1200-1 corresponding to the image 1200 in a serial or in a pre-set order.

In an example embodiment, the image 1200 may be a still image of a single frame, but is not limited thereto, and may be a moving image comprised of a plurality of frames, and in this case, the electronic apparatus 100 may be configured to identify a color corresponding to the respective frames, and project light based on the identified color.

That is, as in the example embodiment of FIG. 12, the electronic apparatus 100 may be configured to identify the main color of the image being projected in the projection image, and project the light corresponding to the main color when entering into the lighting mode while the projection image is being projected.

Figure 13A:
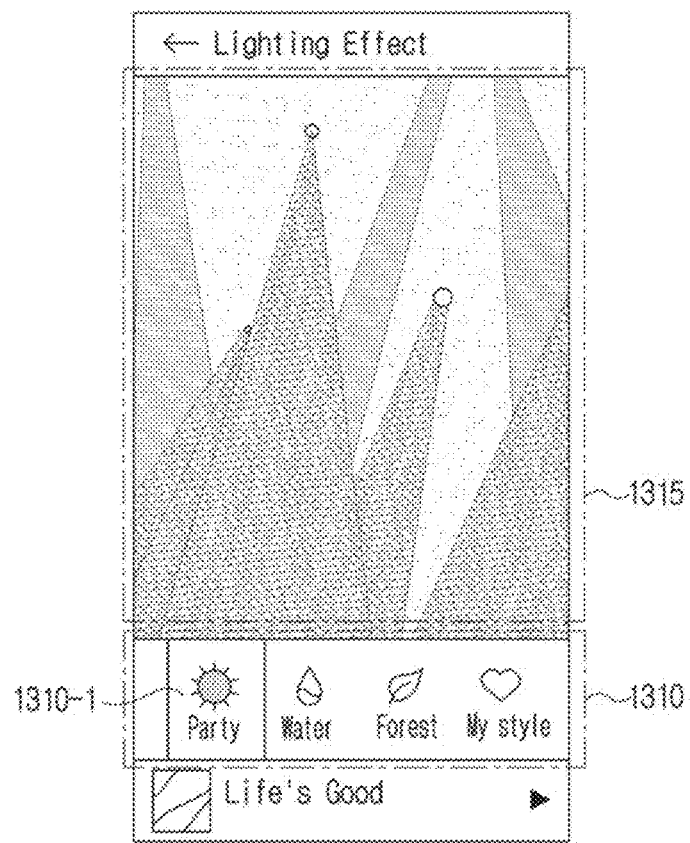
FIG. 13A is a diagram illustrating a user interface (UI) for controlling a color and an image of a light being output from a lighting mode according to an embodiment.
Figure 13B:
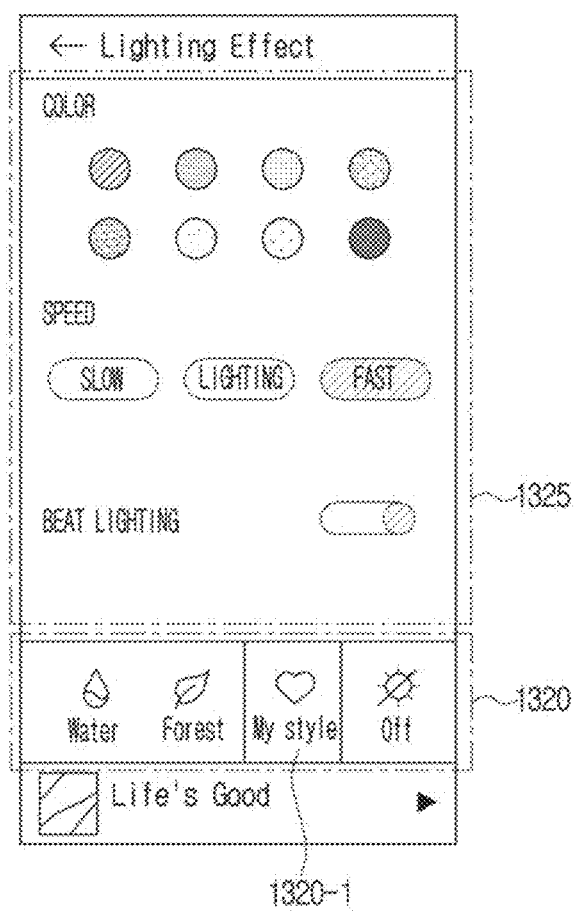
FIG. 13B is a diagram illustrating a UI for controlling a color and an image of light being output from a lighting mode according to an embodiment.

FIG. 13A is a diagram illustrating a UI for controlling a color and an image of the light being output from the lighting mode according to an embodiment. FIG. 13B is a diagram illustrating a UI for controlling a color and an image of light being output from the lighting mode according to an embodiment.

As in FIG. 11 and FIG. 12, the electronic apparatus 100 according to an embodiment may be configured to provide lighting based on a color of the cover 600 or a main color of the image projected while operating in the projection mode, but the disclosure is not limited thereto, and a color provided in the lighting mode may be set by the user.

As an example, when music is being played back in the user terminal apparatus which operates in connection with the electronic apparatus 100, UIs 1310 and 1315 for controlling lighting provided in the electronic apparatus 100 may be displayed on the display of the user terminal apparatus as in FIG. 13A. A first UI 1310 may include icons corresponding to the respective lighting modes to be provided by the electronic apparatus 100, and a second UI 1320 may include an image corresponding to the lighting mode to which the electronic apparatus 100 is currently being operated.

In an example embodiment, when an icon 1310-1 corresponding to a "party" lighting mode from among the first UI 1310 is selected, an image corresponding to the "party" lighting mode may be displayed in the second UI 1320, and the electronic apparatus 100 may be configured to output light according to the "party" lighting mode.

In addition, in an example embodiment, the electronic apparatus 100 may be configured to obtain information on a music content being played back in the user terminal apparatus, and project a projection image corresponding to the information which corresponds to the music content. That is, as in FIG. 13A, the electronic apparatus 100 may be configured to project the projection image corresponding to the "party" lighting mode according to information on the music content being played back in the user terminal apparatus, and based on information corresponding to the music content in the user terminal apparatus, the second UI 1320 may be displayed with an image corresponding to the "party" lighting mode.

Further, as in FIG. 13B, based on an icon 1320-1 corresponding to a "My Style" lighting mode from among the first UI 1320 being selected, setting UIs for adjusting the lighting by the user may be displayed in a second UI 1325.

FIG. 14 is a flowchart illustrating a control method of an electronic apparatus according to an embodiment.

Referring to FIG. 14, in operation S1410, the electronic apparatus 100 may be configured to control the projection unit to operate in the projection mode of projecting light at the first brightness to project the projection image.

In operation S1420, the electronic apparatus 100 may be configured to detect an event for entering into the lighting mode while operating in the projection mode. The event for entering into the lighting mode may be, as an example embodiment, an event in which the cover is coupled on the projection unit. The electronic apparatus 100 may be configured to detect whether the cover is coupled on the projection unit based on the change in illuminance detected through the illuminance sensor or the color information obtained based on the color sensor.

In operation S1430, based on entering into the lighting mode according to the event, the electronic apparatus 100 may be configured to control the projection unit to project light to the second brightness which is darker than (e.g., less than) the first brightness.

In an example embodiment, based on entering into the lighting mode according to the event, the electronic apparatus 100 may be configured to obtain illuminance information in the home through the illuminance sensor, and control the projection unit to adjust the second brightness based on the obtained illuminance information.

In an example embodiment, based on entering into the lighting mode according to the event, the electronic apparatus 100 may be configured to obtain color information of the projection image projected while operating in the projection mode, and control the projection unit to project light corresponding to the obtained color information at the second brightness.

In an example embodiment, based on entering into the lighting mode according to the event, the electronic apparatus 100 may be configured to obtain information on the music content which the user terminal operating in connection with the electronic apparatus is playing back, and based on information on the obtained music content, control the projection unit to project the projection image corresponding to the music content at the second brightness.

In an example embodiment, the projection unit may include the plurality of LED devices, and the electronic apparatus 100 may be configured to control the projection unit to project light at the second brightness by controlling the operating number of the plurality of LED devices.

In an example embodiment, the projection unit may include the plurality of LED devices, and the electronic apparatus 100 may be configured to control the projection unit to project light at the second brightness by controlling the driving current of the plurality of LED devices.

Various modifications may be made to the example embodiments, and there may be various types of embodiments. Accordingly, specific embodiments will be illustrated in drawings, and described in detail in the detailed description. However, it should be noted that the various embodiments are not for limiting the scope of the disclosure to a specific embodiment, but they should be interpreted to include all modifications, equivalents or alternatives of the embodiments. In describing the embodiments, like reference numerals may be used to refer to like elements.

In case it is determined that in describing the example embodiments, the detailed description of related known technologies or configurations may unnecessarily confuse the gist of the disclosure, the detailed description will be omitted.

Further, the example embodiments described above may be modified to forms of various different types, and the technical scope of the disclosure are not limited to the example embodiments below. Rather, the example embodiments are provided to augment the disclosure, and to fully convey the technical idea of the disclosure to those of ordinary skill in the art.

Terms used in the disclosure are used merely to describe the specific example embodiments, and not intended to limit the scope of protection. A singular expression includes a plural expression, unless otherwise specified.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," and so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to another element or as being coupled through other element (e.g., third element).

On the other hand, when a certain element (e.g., first element) is indicated as "directly coupled with/to" or "directly connected to" another element (e.g., second element), it may be understood as the other element (e.g., third element) not being present between the certain element and another element.

The expression "configured to (or set up to)" used in the disclosure may be used interchangeably with, for example, "suitable for" "having the capacity to" "designed to" "adapted to" "made to" or "capable of" based on circumstance. The term "configured to (or set up to)" may not necessarily mean "specifically designed to" in terms of hardware.

Rather, in a certain circumstance, the expression "an apparatus configured to" may mean something that the apparatus "may perform" together with another apparatus or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

The terms "module" or "part" used in the example embodiments herein perform at least one function or operation, and may be implemented with a hardware or software, or a combination of hardware and software. Further, a plurality of "modules" or a plurality of "parts," except for a "module" or a "part" which needs to be implemented to a specific hardware, may be integrated to at least one module and implemented in at least one processor.

Various elements and areas in the drawings may be schematically drawn. Accordingly, the technical idea of the disclosure is not limited by the relative size or distance illustrated in the accompanied drawings.

The various example embodiments described above may be implemented in a recordable medium which is readable by a computer or a device similar to the computer using software, hardware, or the combination of software and hardware. By hardware implementation, the example embodiments of the disclosure may be implemented using at least one from among application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, the example embodiments described herein may be implemented by the processor itself. According to a software implementation, example embodiments such as the procedures and functions described herein may be implemented with separate software modules. The respective software modules described above may perform one or more functions and operations described herein.

Methods according to the various example embodiments of the disclosure described above may be stored in a non-transitory readable medium. The non-transitory readable medium may be installed and used in various apparatuses.

The non-transitory readable medium may refer to a medium that stores data semi-permanently rather than storing data for a very short time, such as a register, a cache, a memory, or the like, and is readable by a device. Specifically, programs for executing the various methods described above may be stored and provided in the non-transitory readable medium such as, for example, and without limitation, a compact disc (CD), a digital versatile disc (DVD), a hard disc, a Blu-ray disc, a USB, a memory card, a ROM, and the like.

According to an example embodiment, methods according to the various example embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE). In case of online distribution, at least a portion of the computer program product (e.g., downloadable app) may be at least stored temporarily in a storage medium such as a server of a manufacturer, a server of an application store, or a memory of a relay server, or temporarily generated.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus comprising:
   a projector comprising a light source and configured to project light;
   an illuminance sensor configured to obtain first illuminance information corresponding to a change in illuminance of the light projected by the projector;
   a color sensor configured to obtain color information;
   a processor; and
   memory for storing instructions that, when executed by the processor, cause the electronic apparatus to:
      control the projector to operate in a projection mode in which the projector projects light at a first brightness to project a first image;
      detect a cover being coupled to the projector and covering the light source while operating in the projection mode based on the first illuminance information obtained by the illuminance sensor and corresponding to the change in the illuminance of the light projected by the projector;
      enter a lighting mode based on detecting the cover being coupled to the projector and covering the light source;
      control, based on entering the lighting mode, the projector to project light through the cover that is coupled to the projector and that is covering the light source at a second brightness which is less than the first brightness,
      obtain, by the color sensor and based on entering the lighting mode while the cover is coupled to the projector and covers the light source, color information corresponding to the cover; and
      control the projector to project light of a color corresponding to the obtained color information at the second brightness.

2. The electronic apparatus of claim 1, wherein the color sensor is configured to obtain color information based on a change in color of the light projected by the projector, and
   wherein the instructions, when executed by the processor, further cause the electronic apparatus to detect whether the cover is coupled on the projector based on the color information obtained by the color sensor.

3. The electronic apparatus of claim 2, wherein the instructions, when executed by the processor, further cause the electronic apparatus to:
   obtain, based on entering the lighting mode according to the cover being coupled to the projector, second illuminance information of a home through the illuminance sensor, and
   control the projector to adjust the second brightness based on the obtained second illuminance information.

4. The electronic apparatus of claim 1, wherein the cover comprises a plurality of diffusion plates.

5. The electronic apparatus of claim 1, wherein the instructions, when executed by the processor, further cause the electronic apparatus to:
   obtain, based on entering the lighting mode according to the cover being coupled to the projector, color information of the first image projected while the projector operates in the projection mode, and
   control the projector to project light of a color corresponding to the obtained color information at the second brightness.

6. The electronic apparatus of claim 1, wherein the instructions, when executed by the processor, further cause the electronic apparatus to:
   obtain, based on entering the lighting mode according to the cover being coupled to the projector, information on a music content which a user terminal is playing back, and
   control, based on the obtained information on the music content, the projector to project a second image corresponding to the music content at the second brightness.

7. The electronic apparatus of claim 1, wherein the light source of the projector comprises a plurality of light-emitting diode (LED) devices, and
   wherein the instructions, when executed by the processor, further cause the electronic apparatus to control the projector to project light at the second brightness by controlling an operating number of the plurality of LED devices.

8. The electronic apparatus of claim 1, wherein the light source of the projector comprises a plurality of light-emitting diode (LED) devices, and
   wherein the instructions, when executed by the processor, further cause the electronic apparatus to control the projector to project light at the second brightness by controlling a driving current of the plurality of LED devices.

9. A control method of an electronic apparatus, the control method comprising:
   controlling a projector comprising a light source to operate in a projection mode in which the projector projects light at a first brightness to project a first image;
   obtaining, by an illuminance sensor, first illuminance information corresponding to a change in illuminance of the light projected by the projector;
   detecting a cover being coupled to the projector and covering the light source while operating in the projection mode based on the first illuminance information obtained by the illuminance sensor and corresponding to the change in the illuminance of the light projected by the projector;
   entering a lighting mode based on detecting the cover being coupled to the projector and covering the light source;
   controlling, based on entering the lighting mode, the projector to project light through the cover that is coupled to the projector and that is covering the light source at a second brightness which is less than the first brightness;

obtaining, by a color sensor and based on entering the lighting mode while the cover is coupled to the projector and covers the light source, color information corresponding to the cover; and control the projector to project light of a color corresponding to the obtained color information at the second brightness.

10. The control method of claim 9, further comprising:

obtaining, by the color sensor, color information based on a change in color of the light projected by the projector; and detecting whether the cover is coupled on the projector based on the color information obtained by the color sensor.

11. The control method of claim 10, further comprising:

obtaining, based on entering the lighting mode according to the cover being coupled to the projector, second illuminance information of a home through the illuminance sensor; and controlling the projector to adjust the second brightness based on the obtained second illuminance information.

12. The control method of claim 9, wherein the cover comprises a plurality of diffusion plates.

13. An electronic device, comprising:

a projector comprising a light source;

an illuminance sensor configured to obtain first illuminance information corresponding to a change in illuminance of the light projected by the projector;

a color sensor configured to obtain color information;

a processor; and memory storing instructions that, when executed by the processor, cause the electronic device to:

operate in a first mode in which the projector projects light at a first brightness;

detect a cover being coupled to the projector and covering the light source while operating in the first mode based on the first illuminance information obtained by the illuminance sensor and corresponding to the change in the illuminance of the light projected by the projector;

switch to a second mode based on detecting the cover being coupled to the projector and covering the light source;

operate in the second mode in which the projector projects light through the cover that is coupled to the projector and that is covering the light source at a second brightness that is less than the first brightness;

obtain, by the color sensor and based on switching to the second mode while the cover is coupled to the projector and covers the light source, color information corresponding to the cover; and control the projector to project light of a color corresponding to the obtained color information at the second brightness.

14. The electronic device of claim 13, wherein the color sensor is configured to obtain color information based on a change in color of the light projected by the projector, and wherein the instructions, when executed by the processor, further cause the electronic device to detect the whether the cover is coupled based on the color information obtained by the color sensor.

* * * * *